(12) United States Patent
Blakeley et al.

(10) Patent No.: US 12,342,432 B2
(45) Date of Patent: *Jun. 24, 2025

(54) COLOR TEMPERATURE CONTROL OF A LIGHTING DEVICE

(71) Applicant: Lutron Technology Company LLC, Coopersburg, PA (US)

(72) Inventors: Matthew R. Blakeley, Allentown, PA (US); Christopher M. Green, Austin, TX (US); Peter MacLellan, Austin, TX (US); Robert C. Newman, Jr., Emmaus, PA (US); Jaykrishna A. Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,557

(22) Filed: Aug. 14, 2023

(65) Prior Publication Data

US 2023/0389149 A1 Nov. 30, 2023

Related U.S. Application Data

(63) Continuation of application No. 17/219,399, filed on Mar. 31, 2021, now Pat. No. 11,743,985.
(Continued)

(51) Int. Cl.
*H05B 45/20* (2020.01)
*H05B 45/10* (2020.01)
(Continued)

(52) U.S. Cl.
CPC ............ *H05B 45/20* (2020.01); *H05B 45/10* (2020.01); *H05B 47/11* (2020.01); *H05B 47/16* (2020.01); *H05B 47/19* (2020.01)

(58) Field of Classification Search
CPC ........ H05B 45/20; H05B 45/10; H05B 47/11; H05B 47/16; H05B 47/19; H05B 45/22; Y02B 20/40
See application file for complete search history.

(56) References Cited

U.S. PATENT DOCUMENTS 9,332,598 B1 5/2016 Ho et al.
9,392,660 B2 7/2016 Dias et al.
(Continued)

FOREIGN PATENT DOCUMENTS

WO 2013166524 A1 11/2013

*Primary Examiner* — Minh D A
(74) *Attorney, Agent, or Firm* — Flaster Greenberg PC

(57) ABSTRACT

The lighting device may be configured to perform black body curve fading. For example, the control circuit may be configured to control the drive circuit such that the light emitted by the lighting load is adjusted (e.g., faded) along a black body curve. The control circuit may be configured to determine whether to fade from an initial color to a destination color in a Correlated Color Temperature (CCT) chromaticity space or an XY chromaticity space. The control circuit may be configured to determine whether the initial color and/or the destination color are on the black body curve. When the initial color and the destination color are determined to be on the black body curve, the control circuit may be configured to control the drive circuit such that the light emitted by the lighting device is adjusted from the initial color to the destination color along the black body curve.

53 Claims, 11 Drawing Sheets

Related U.S. Application Data

(60) Provisional application No. 63/022,095, filed on May 8, 2020, provisional application No. 63/003,138, filed on Mar. 31, 2020.

(51) Int. Cl.
*H05B 47/11* (2020.01)
*H05B 47/16* (2020.01)
*H05B 47/19* (2020.01)

(56) References Cited

U.S. PATENT DOCUMENTS

| | | | |
|---|---|---|---|
| 9,392,663 B2 | 7/2016 | Knapp et al. | |
| 9,485,813 B1 | 11/2016 | Lewis et al. | |
| 9,510,416 B2 | 11/2016 | Dias et al. | |
| 9,538,603 B2 | 1/2017 | Abraham et al. | |
| 9,557,214 B2 | 1/2017 | Ho et al. | |
| 9,736,895 B1* | 8/2017 | Dong | F21V 5/004 |
| 9,769,899 B2 | 9/2017 | Ho et al. | |
| 9,795,000 B1* | 10/2017 | Sooch | H05B 47/16 |
| 9,888,543 B2 | 2/2018 | Chitta et al. | |
| 10,161,786 B2 | 12/2018 | Chang et al. | |
| 10,555,395 B1 | 2/2020 | Qiu | |
| 10,582,596 B2 | 3/2020 | Sooch et al. | |
| 10,595,372 B2 | 3/2020 | Ho et al. | |
| 10,624,171 B2 | 4/2020 | Sooch et al. | |
| 11,743,985 B2* | 8/2023 | Green | H05B 45/22 315/291 |
| 2004/0105261 A1* | 6/2004 | Ducharme | F21V 23/045 362/231 |
| 2005/0040774 A1 | 2/2005 | Mueller et al. | |
| 2008/0215279 A1 | 9/2008 | Salsbury et al. | |
| 2014/0035472 A1* | 2/2014 | Raj | H05B 45/22 315/297 |
| 2014/0312777 A1 | 10/2014 | Shearer et al. | |
| 2015/0382422 A1 | 12/2015 | Ho et al. | |
| 2016/0183344 A1 | 6/2016 | Chitta et al. | |
| 2017/0263174 A1* | 9/2017 | Chen | G09G 5/02 |
| 2018/0077770 A1 | 3/2018 | Sooch et al. | |
| 2018/0077783 A1* | 3/2018 | Sooch | H05B 45/28 |
| 2018/0215279 A1 | 8/2018 | Beekmann | |
| 2018/0368236 A1 | 12/2018 | Ostojic et al. | |
| 2019/0086046 A1 | 3/2019 | Ganick et al. | |
| 2020/0077483 A1 | 3/2020 | Agarwal et al. | |

\* cited by examiner

COLOR TEMPERATURE CONTROL OF A LIGHTING DEVICE

CROSS REFERENCE TO RELATED APPLICATIONS

This application is a continuation of U.S. non-provisional patent application Ser. No. 17/219,399, filed Mar. 31, 2021, which claims priority to U.S. provisional patent application No. 63/003,138, filed Mar. 31, 2020, and U.S. provisional patent application No. 63/022,095, filed May 8, 2020, which are incorporated herein by reference in their entirety.

BACKGROUND

Lamps and displays using efficient lighting devices, such as light-emitting diodes (LED) lighting devices, for illumination are becoming increasingly popular in many different markets. LED lighting devices provide a number of advantages over traditional lighting devices, such as incandescent and fluorescent lamps. For example, LED lighting devices may have a lower power consumption and a longer lifetime than traditional lighting devices. In addition, the LED lighting devices may have no hazardous materials, and may provide additional specific advantages for different applications. When used for general illumination, LED lighting devices provide the opportunity to adjust the color (e.g., from white, to blue, to green, etc.) or the color temperature (e.g., from warm white to cool white) of the light emitted from the LED lighting devices to produce different lighting effects.

A multi-colored LED illumination device may have two or more different colors of LED emission devices (e.g., LED emitters) that are combined within the same package to produce light (e.g., white or near-white light). There are many different types of white light LED lighting devices on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600 K-3700 K), to neutral white (e.g., approximately 3700 K-5000 K) to cool white (e.g., approximately 5000 K-8300 K). Some multi-colored LED illumination devices also may enable an intensity (e.g., lighting intensity and/or brightness) and/or color of the illumination to be changed to a particular set point. These tunable illumination devices may all produce the same color and color rendering index (CRI) when set to a particular dimming level and chromaticity setting (e.g., color set point) on a standardized chromaticity diagram.

SUMMARY

As described herein, a lighting device (e.g., a controllable light-emitting diode (LED) illumination device) may be responsive to wireless signals (e.g., radio-frequency signals). For example, the lighting device may include a wireless communication circuit that is configured to communicate wireless messages. The lighting device may include a lighting load (e.g., one or more emitter modules) configured to emit light. The lighting device may include a drive circuit for controlling the lighting load to emit light. The lighting device may include a control circuit configured to control the drive circuit.

The lighting device may be configured to perform black body curve fading. For example, the control circuit may be configured to control the drive circuit such that the light emitted by the lighting load is adjusted (e.g., faded) along a black body curve. The drive circuit may be configured to control the lighting load to emit light having a first color. The control circuit may be configured to receive, via the wireless communication circuit, a first message indicating a second color. The first color may be an initial color. The second color may be a destination color. The first message may include a fade request (e.g., in an XY chromaticity space). The fade request may include fade information associated with the second color. The second color may be indicated in an XY chromaticity space, a Correlated Color Temperature (CCT) chromaticity space, or another color space. The control circuit may be configured to determine whether to fade from the first color to the second color in the CCT chromaticity space or the XY chromaticity space.

The control circuit may be configured to determine whether the first color and/or the second color are on the black body curve. The first color and/or the second color may be determined to be on the black body curve when they are within a threshold value from the black body curve. The threshold value may be a delta uv measurement. When the first color and the second color are determined to be on the black body curve, the control circuit may be configured to control the drive circuit such that the light emitted by the lighting device is adjusted from the first color to the second color along the black body curve.

The control circuit may be configured to convert the first color and/or the second color to the CCT chromaticity space (e.g., from the XY chromaticity space). The first color and/or the second color may be converted to the CCT chromaticity space using one or more (e.g., a set of) equations and/or a look-up table stored in a memory of the lighting device. The control circuit may be configured to adjust the first color to the second color in the CCT chromaticity space. For example, the control circuit may perform a fade between the first color and the second color along the black body curve. For example, the control circuit may perform the fade according to a linear relationship between color (e.g., color temperature) and time. In addition, the control circuit may perform the fade according to a non-linear relationship between color and time, such that a perceived change in the color is approximately linear with respect to time. The control circuit may determine a plurality of CCT values along the black body curve between the first color and the second color. The plurality of CCT values may be associated with the linear or non-linear relationship between color and time. The control circuit may be configured to convert each of the plurality of CCT chromaticity values into the XY chromaticity space to determine a plurality of XY chromaticity coordinates. For example, the control circuit may be configured to convert each of the plurality of CCT chromaticity values into a plurality of uv chromaticity values. The control circuit may then be configured to convert the plurality of uv chromaticity values into the plurality of XY chromaticity coordinates.

The control circuit may be configured to control the drive circuit based on the plurality of XY chromaticity coordinates. For example, the control circuit may be configured to sequentially send each of the plurality of XY chromaticity coordinates to the drive circuit at respective time instances. The control circuit may be configured to determine a time schedule (e.g., such as a time delay between adjacent XY chromaticity coordinates) and may send the plurality of XY chromaticity coordinates to the drive circuit according to the time schedule. The lighting device may include one or more sensors configured to measure a color of the light emitted by the lighting device. The control circuit may be configured to compare the measured color to the second color. If the measured color is different than the second color by more than a predetermined value, the control circuit may be configured to adjust the control of the lighting load until the measure color is within the predetermined value of the second color.

The lighting device may be configured to adjust a color of light emitted by the lighting device based on a light level of ambient light proximate to the lighting device. The lighting device may be configured to measure the light level and/or a first color temperature of the ambient light proximate to the lighting device. The lighting device may determine whether the first color temperature is less than a red threshold temperature or greater than a blue threshold temperature at the determined light level. If the first color temperature is less than the red threshold temperature at the determined light level, the lighting device may control the lighting load such that the light emitted by the lighting device comprises a second color temperature that is equal to or greater than the red threshold temperature at the determined light level. If the first color temperature is greater than the blue threshold temperature at the determined light level, the lighting device may control the lighting load such that the light emitted by the lighting device comprises a third color temperature that is equal to or less than the blue threshold temperature at the determined light level. The lighting device may be configured to determine a CCT-illuminance curve (e.g., one or more values of the CCT-illuminance curve) to use. The lighting device may determine, using the determined CCT-illuminance curve, a present color temperature based on the illuminance level of ambient light. The lighting device may control respective intensities of the plurality of emitters to emit light at the determined present color temperature.

The lighting device may be configured to control a lighting load using one or more dimming curves. For example, the lighting device may switch dimming curves at a low ambient light level. The lighting device may be configured to determine an ambient light level proximate to the lighting device. The lighting device may be configured to compare the ambient light level to a predetermined threshold. If the ambient light level is greater than the predetermined threshold, the lighting device may be configured to control the lighting load according to a first dimming curve. If the ambient light level is less than a predetermined threshold, the lighting device may be configured to control the lighting load according to a second dimming curve.

DETAILED DESCRIPTION

Figure 1:
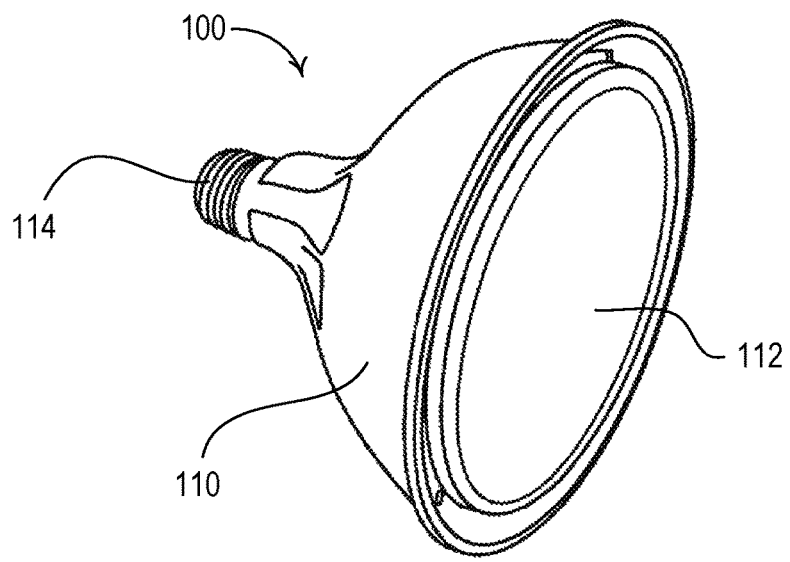
FIG. 1 is a simplified perspective view of an example lighting device.

FIG. 1 is a simplified perspective view of an example illumination device, such as a lighting device 100 (e.g., a light-emitting diode (LED) lighting device). The lighting device 100 may have a parabolic form factor and may be a parabolic aluminized reflector (PAR) lamp. The lighting device 100 may include a housing 110 and a lens 112 (e.g., an exit lens), through which light from an internal lighting load (not shown) may shine. The lighting device 100 may include a screw-in base 114 that may be configured to be screwed into a standard Edison socket for electrically coupling the lighting device 100 to an alternating-current (AC) power source.

Figure 2:
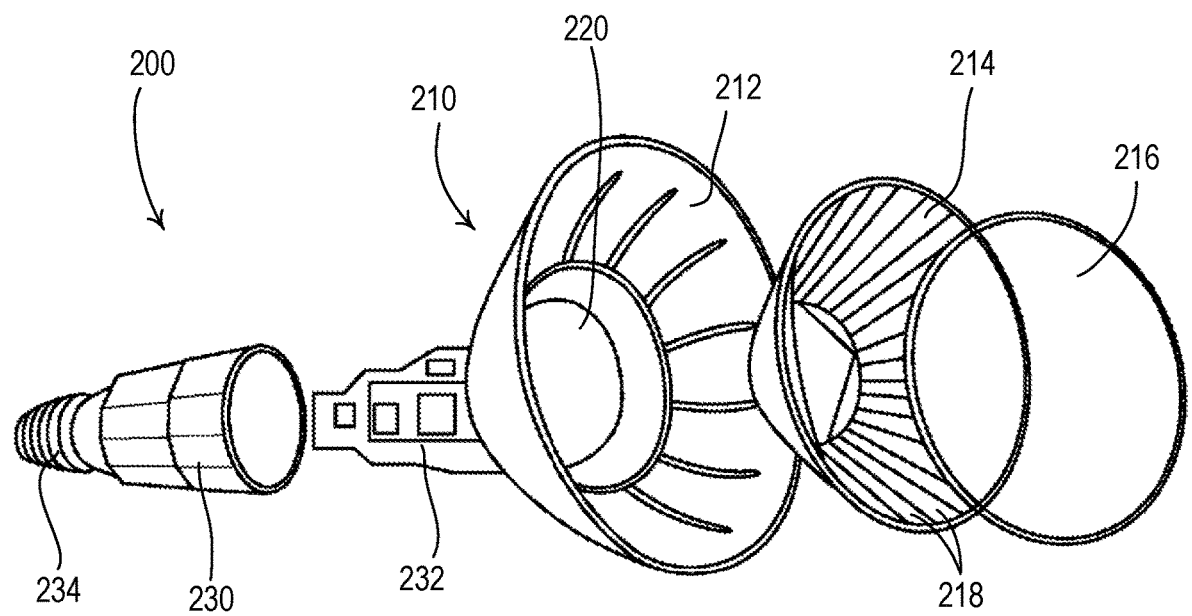
FIG. 2 is an exploded view of another example lighting device.

FIG. 2 is an exploded view of another example lighting device 200 (e.g., an LED lighting device) having a parabolic form factor (e.g., which may have a similar assembly as the lighting device 100 shown in FIG. 1). The lighting device 200 may include an emitter housing 210 that includes a heat sink 212 and a reflector 214 (e.g., a parabolic reflector), and a lens 216 (e.g., an exit lens). The lighting device 200 may include a lighting load, such as an emitter module 220, that may include one or more emission LEDs. The emitter module 220 may be enclosed by the emitter housing 210 and may be configured to shine light through the lens 216. The lens 216 may be made of any suitable material, for example glass. The lens 216 may be transparent or translucent and may be flat or domed, for example. The reflector 214 may shape the light produced by the emission LEDs within the emitter module 220 into an output beam. The reflector 216 may include planar facets 218 (e.g., lunes) that may provide some randomization of the reflections of the light rays emitted by the emitter module 220 prior to exiting lighting device 220 through the lens 216. The lens 216 may include an array of lenslets (not shown) formed on both sides of the lens 216. An example of a lighting device having a lens with lenslets is described in greater detail in U.S. Pat. No. 9,736,895, issued Aug. 15, 2017, entitled COLOR MIXING OPTICS FOR LED ILLUMINATION DEVICE, the entire disclosure of which is hereby incorporated by reference.

The lighting device 200 may include a driver housing 230 that may be configured to house a driver printed circuit board (PCB) 232 on which the electrical circuitry of the lighting device 200 may be mounted. The lighting device 200 may include a screw-in base 234 that may be configured to be screwed into a standard Edison socket for electrically coupling the lighting device 200 to an alternating-current (AC) power source. The screw-in base 234 may be attached to the driver housing 230 and may be electrically coupled to the electrical circuitry mounted to the driver PCB 232. The driver PCB 232 may be electrically connected to the emitter module 220, and may include one or more drive circuits and/or one or more control circuits for controlling the amount of power delivered to the emitter LEDs of the emitter module 220. The driver PCB 232 and the emitter module 220 may be thermally connected to the heat sink 212.

Figure 3:
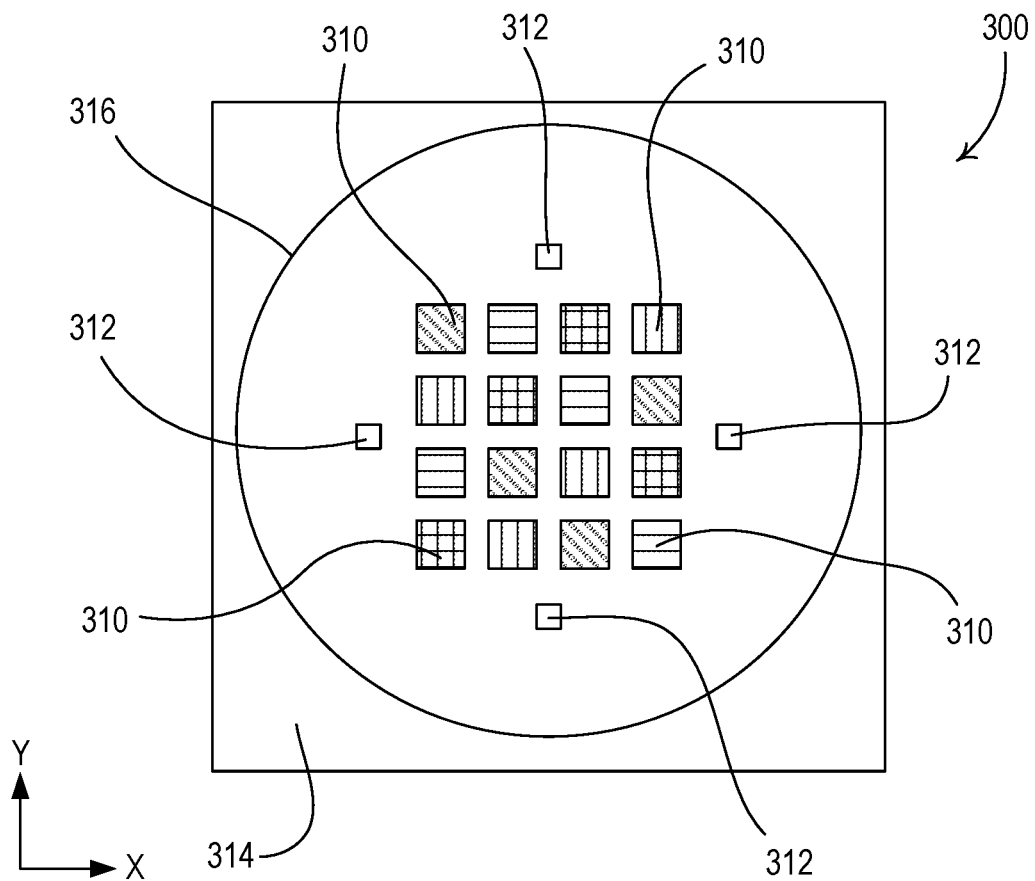
FIG. 3 is a top view of an example emitter module.

FIG. 3 is a top view of an example emitter module 300 (e.g., the emitter module 220 of the lighting device 200) that is configured to be used within a lighting device (e.g., such as lighting device 100 shown in FIG. 1 or lighting device 200 shown in FIG. 2). The emitter module 300 may include an array of emitters 310 (e.g., emission LEDs) and detectors 312 (e.g., detection LEDs) mounted on a substrate 314 and encapsulated by a primary optics structure, such as a dome 316. For example, the emitter module 300 may include an array of sixteen emitters 310 and four detectors 312. The emitters 310, the detectors 312, the substrate 314, and the dome 316 may form an optical system. The emitters 310 may be arranged in a square array as close as possible together in the center of the dome 316, so as to approximate a centrally located point source. The emitter module 300 may include multiple "chains" of emitters 310 (e.g., series-coupled emitters). The emitters 310 of each chain may be coupled in series and may conduct the same drive current. Each chain may include emitters 310 that produce illumination at a different peak emission wavelength (e.g., emit light of the same color). The emitters 310 of different chains may emit light of different colors. For example, the emitter module 300 may include four differently-colored chains of emitters 310 (e.g., red, green, blue, and white or yellow). The array of emitters 310 may include a chain of four red emitters, a chain of four green emitters, a chain of four blue emitters, and a chain of four white or yellow emitters. The individual emitters 310 in each chain may be scattered about the array, and arranged so that no color appears twice in any row, column, or diagonal, to improve color mixing within the emitter module 300.

The detectors 312 may be placed close to each edge of the array of emitters 310 and/or and in the middle of the array of emitters 310 and may be connected in parallel to a receiver of the lighting device. Similar to the emitters 310, the detectors 312 may be LEDs that can be used to emit or receive optical or electrical signals. When the detectors 312 are coupled to receive optical signals and emit electrical signals, the detectors 312 may produce current indicative of incident light from, for example, an emitter, a plurality of emitters, or a chain of emitters. The detectors 312 may be any device that produces current indicative of incident light, such as a silicon photodiode or an LED. For example, the detectors 312 may each be an LED having a peak emission wavelength in the range of approximately 550 nm to 700 nm, such that the detectors 312 may not produce photocurrent in response to infrared light (e.g., to reduce interference from ambient light).

The substrate 314 of the emitter module 310 may be a ceramic substrate formed from an aluminum nitride or an aluminum oxide material or some other reflective material, and may function to improve output efficiency of the emitter module 300 by reflecting light out of the emitter module 300 through the dome 316. The dome 316 may include an optically transmissive material, such as silicon or the like, and may be formed through an over-molding process, for example. A surface of the dome 316 may be lightly textured to increase light scattering and promote color mixing, as well as to reflect a small amount of the emitted light back toward the detectors 312 mounted on the substrate 314 (e.g., about 5%). The size of the dome 316 (e.g., a diameter of the dome in a plane of the emitters 310) may be generally dependent on the size of the array of emitters 310. The diameter of the dome 316 may be substantially larger (e.g., about 1.5 to 4 times larger) than the diameter of the array of emitters 310 to prevent occurrences of total internal reflection.

Another form factor of a lighting device may be a linear form factor. A linear lighting device may include a number of the emitter modules (e.g., such as the emitter module 220, 300) spaced apart and arranged in a linear manner (e.g., in a line). Each emitter module in the linear lighting device may include a plurality of emitters and at least one dedicated detector, all of which may mounted onto a common substrate and encapsulated within a primary optics structure. The primary optics structure may be formed from a variety of different materials and may have substantially any shape and/or dimensions necessary to mix the light emitted by the emitters in any desirable manner.

Figure 4:
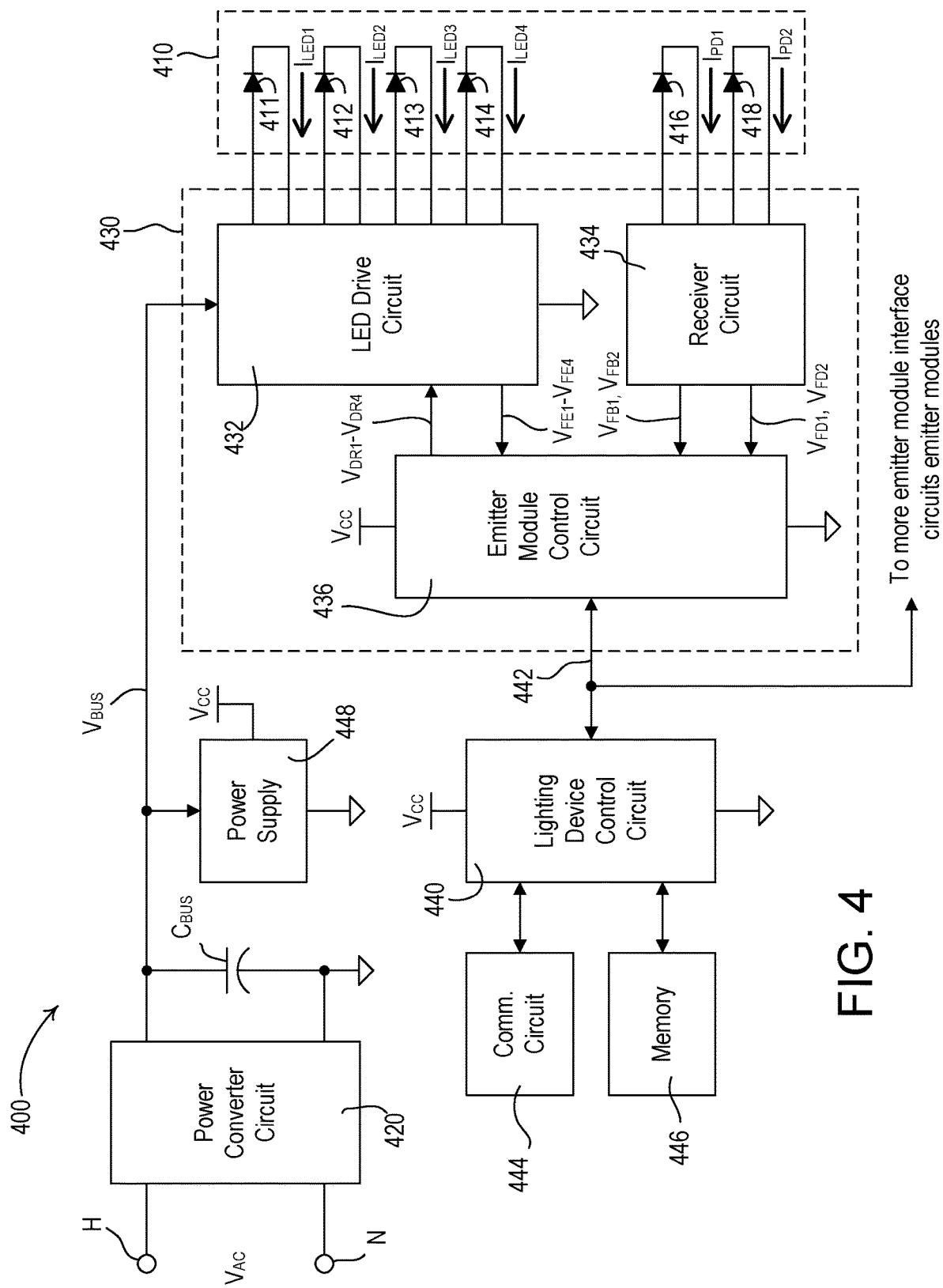
FIG. 4 is a simplified block diagram of an example lighting device.

FIG. 4 is a simplified block diagram of an example electrical device, such as a lighting device 400 (e.g., the lighting device 100 shown in FIG. 1 and/or the lighting device 200 shown in FIG. 2). The lighting device 400 may include one or more emitter modules 410 (e.g., such as the emitter module 220 shown in FIG. 2 or the emitter module 300 shown in FIG. 3). For example, if the lighting device 400 is a PAR lamp (e.g., as shown in FIGS. 1 and 2), the lighting device 400 may include a single emitter module 410. The emitter module 410 may include one or more emitters 411, 412, 413, 414. Each of the emitters 411, 412, 413, 414 is shown in FIG. 4 as a single LED, but may each include a plurality of LEDs connected in series (e.g., a chain of LEDs), a plurality of LEDs connected in parallel, or a suitable combination thereof, depending on the particular lighting system. In addition, each of the emitters 411, 412, 413, 414 may include one or more organic light-emitting diodes (OLEDs). For example, the first emitter 411 may represent a chain of red LEDs, the second emitter 412 may represent a chain of blue LEDs, the third emitter 413 may represent a chain of green LEDs, and the fourth emitter 414 may represent a chain of white or amber LEDs. The emitters 411, 412, 413, 414 may be controlled to adjust an intensity (e.g., lighting intensity or brightness) and/or a color (e.g., a color temperature) of a cumulative light output of the lighting device 400. The emitter module 410 may also include one or more detectors 416, 418 (e.g., photodiodes, such as a red LED and a green LED) that may produce respective photodiode currents $I_{PD1}$, $I_{PD2}$ (e.g., detector signals) in response to incident light.

The lighting device 400 may include a power converter circuit 420, which may receive a source voltage, such as an AC mains line voltage $V_{AC}$, via a hot connection H and a neutral connection N, and generate a DC bus voltage $V_{BUS}$ (e.g., approximately 15-20V) across a bus capacitor $C_{BUS}$. The power converter circuit 420 may include, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 420 may provide electrical isolation between the AC power source and the emitters 411, 412, 413, 414, and may operate as a power factor correction (PFC) circuit to adjust the power factor of the lighting device 400 towards a power factor of one.

The lighting device 400 may include one or more emitter module interface circuits 430 (e.g., one emitter module interface circuit per emitter module 410 in the lighting device 400). The emitter module interface circuit 430 may include an LED drive circuit 432 for controlling (e.g., individually controlling) the power delivered to and an intensity (e.g., lighting intensity and/or luminous flux) of the light emitted of each of the emitters 411, 412, 413, 414 of the respective emitter module 410. The LED drive circuit 432 may receive the bus voltage $V_{BUS}$ and may adjust magnitudes of respective LED drive currents $I_{LED1}$, $I_{LED2}$, $I_{LED3}$, $I_{LED4}$ conducted through the emitters 411, 412, 413, 414. The LED drive circuit 432 may include one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 432 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The emitter module interface circuit 430 may also include a receiver circuit 434 that may be electrically coupled to the detectors 416, 418 of the emitter module 410 for generating respective optical feedback signals $V_{FB1}$, $V_{FB2}$ in response to the photodiode currents $I_{PD1}$, $I_{PD2}$. The receiver circuit 434 may include one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The emitter module interface circuit 430 may also include an emitter module control circuit 436 for controlling the LED drive circuit 432 to control the intensities of the emitters 411, 412, 413, 414 of the emitter module 410. The emitter module control circuit 436 may include, for example, a microprocessor, a microcontroller, a programmable logic device (PLD), an application specific integrated circuit (ASIC), a field-programmable gate array (FPGA), or any other suitable processing device or controller. The emitter module control circuit 436 may generate one or more drive signals $V_{DR1}$, $V_{DR2}$, $V_{DR3}$, $V_{DR4}$ for controlling the respective regulation circuits in the LED drive circuit 432. The emitter module control circuit 436 may receive the optical feedback signals $V_{FB1}$, $V_{FB2}$ from the receiver circuit 434 for determining a luminous flux $L_E$ of the light emitted by the emitters 411, 412, 413, 414.

The emitter module control circuit 436 may also receive a plurality of emitter forward-voltage feedback signals $V_{FE1}$, $V_{FE2}$, $V_{FE3}$, $V_{FE4}$ from the LED drive circuit 432 and a plurality of detector forward-voltage feedback signals $V_{FD1}$, $V_{FD2}$ from the receiver circuit 434. The emitter forward-voltage feedback signals $V_{FE1}$-$V_{FE4}$ may be representative of the magnitudes of the forward voltages of the respective emitters 411, 412, 413, 414, which may indicate temperatures $T_{E1}$, $T_{E2}$, $T_{E3}$, $T_{E4}$ of the respective emitters. If each emitters 411, 412, 413, 414 includes multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 416, 418, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 416, 418.

The lighting device 400 may include a lighting device control circuit 440 that may be electrically coupled to the emitter module control circuit 436 of each of the one or more emitter module interface circuits 430 via a communication bus 442 (e.g., an I²C communication bus). The lighting device control circuit 440 may be configured to communicate with the emitter module control circuit 436 via the communication bus 443 to control the emitters 411, 412, 413, 414 to control the intensity (e.g., lighting intensity and/or brightness) and/or the color (e.g., the color temperature) of the cumulative light emitted by the lighting device 400. The lighting device control circuit 440 may include, for example, a microprocessor, a microcontroller, a programmable logic device (PLD), an application specific integrated circuit (ASIC), a field-programmable gate array (FPGA), or any other suitable processing device or controller. The lighting device control circuit 440 may be configured to adjust (e.g., dim) a present intensity $L_{PRES}$ (e.g., a present brightness) of the cumulative light emitted by the lighting device 400 towards a target intensity $L_{TRGT}$ (e.g., a target brightness), which may range across a dimming range of the lighting device, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The lighting device control circuit 440 may be configured to adjust a present color $C_{PRES}$ of the cumulative light emitted by the lighting device 400 towards a target color $C_{TRGT}$ (e.g., in an XY chromaticity space, where colors may be defined by an x-chromaticity coordinate and a y-chromaticity coordinate). The lighting device control circuit 440 may be configured to adjust a present color temperature $T_{PRES}$ of the cumulative light emitted by the lighting device 400 towards a target color temperature $T_{TRGT}$ (e.g., in a Correlated Color Temperature (CCT) chromaticity space, where colors may be defined by a color temperature value). The CCT chromaticity space may range between warm-white color temperature (e.g., approximately 1400 K) and a cool-white color temperature (e.g., approximately 10,000 K). For example, the lighting device control circuit 440 may be configured to adjust the present color $C_{PRES}$ of the cumulative light emitted by the lighting device 400 by transmitting an x-chromaticity coordinate and a y-chromaticity coordinate (e.g., in the XY chromaticity space) to the emitter module control circuit 436. In addition, the lighting device control circuit 440 may be configured to adjust the present color $C_{PRES}$ of the cumulative light emitted by the lighting device 400 by transmitting the target color temperature $T_{TRGT}$ (e.g., in the CCT chromaticity space) to the emitter module control circuit 436.

The lighting device 400 may include a communication circuit 444 coupled to the lighting device control circuit 440. The communication circuit 444 may include one or more wireless communication circuits, such as, for example, a radio-frequency (RF) transceiver coupled to an antenna for transmitting and/or receiving RF signals. The one or more wireless communication circuits may comprise an RF transmitter for transmitting RF signals, an RF receiver for receiving RF signals, or an infrared (IR) transmitter and/or receiver for transmitting and/or receiving IR signals. For example, the communication circuit 444 may comprise a first wireless communication circuit capable of communicating on a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and a second wireless communication circuit capable of communicating on a second wireless communication link (e.g., a short-range wireless communication link) using a second wireless protocol (e.g., a short-range wireless communication protocol, such as the BLUETOOTH and/or BLUETOOTH LOW ENERGY (BLE) protocols). The communication circuit 444 may be configured to receive RF signals (e.g., wireless control signals) from one or more remote control devices via the wireless network communication link. The wireless control signals may include messages that indicate a destination color (e.g., in the XY chromaticity space, the CCT chromaticity space, a uv color space, and/or the like). The communication circuit 444 may be configured to receive RF signals (e.g., wireless configuration signals) from a computing device (e.g., a computer, a cloud server, a mobile device, such as a smart phone and/or a tablet, etc.) via the short-range wireless communication link (e.g., for configuring the operation of the lighting device 400). In addition, the communication circuit 444 may be coupled to the hot connection H and the neutral connection N of the lighting device 400 for transmitting a control signal via the electrical wiring using, for example, a power-line carrier (PLC) communication technique.

The lighting device control circuit 440 may be configured to determine the target intensity $L_{TRGT}$, the target color $C_{TRGT}$, and/or the target color temperature $T_{TRGT}$ for the lighting device 400 in response to messages (e.g., digital messages) received via the communication circuit 434. When the lighting device control circuit 440 receives a target color temperature $T_{TRGT}$, the lighting device control circuit 440 may be configured to convert the target color temperature $T_{TRGT}$ from the CCT chromaticity space to a target color $C_{TRGT}$ in the XY chromaticity space (e.g., as defined by an x-chromaticity coordinate and a y-chromaticity coordinate). The lighting device control circuit 440 may transmit the x-chromaticity coordinate and a y-chromaticity coordinate defining the target color $C_{TRGT}$ to the emitter module control circuit 436.

The lighting device 400 may include a memory 446 configured to store operational characteristics of the lighting device 400 (e.g., the target intensity $L_{TRGT}$, the target color temperature $T_{TRGT}$, the low-end intensity $L_{LE}$, the high-end intensity $L_{HE}$, etc.). The memory may be implemented as an external integrated circuit (IC) or as an internal circuit of the lighting device control circuit 440. The lighting device 400 may include a power supply 448 that may receive the bus voltage $V_{BUS}$ and generate a supply voltage $V_{CC}$ for powering the lighting device control circuit 440 and other low-voltage circuitry of the lighting device 400.

When the lighting device 400 is on, the lighting device control circuit 440 may be configured to control the emitter module(s) 410 to emit light substantially all of the time. The lighting device control circuit 440 may be configured to control the emitter module(s) 410 to disrupt the normal emission of light to measure one or more operational characteristics of the emitter modules during periodic measurement intervals. For example, during the measurement intervals, the emitter module control circuit 436 may be configured to individually turn on each of the different-colored emitters 411, 412, 413, 414 of the emitter module(s) 410 (e.g., while turning of the other emitters) and measure the luminous flux $L_E$ of the light emitted by that emitter using one of the two detectors 416, 418. For example, the emitter module control circuit 436 may turn on the first emitter 411 of the emitter module 410 (e.g., at the same time as turning off the other emitters 412, 413, 414) and determine the luminous flux $L_E$ of the light emitted by the first emitter 411 in response to the first optical feedback signal $V_{FB1}$ generated from the first detector 416. In addition, the emitter module control circuit 436 may be configured to drive the emitters 411, 412, 413, 414 and the detectors 416, 418 to generate the emitter forward-voltage feedback signals $V_{FE1}$-$V_{FE4}$ and the detector forward-voltage feedback signals $V_{FD1}$, $V_{FD2}$ during the measurement intervals.

Methods of measuring the operational characteristics of emitter modules in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the lighting device 400 may be stored in the memory 446 as part of a calibration procedure performed during manufacturing of the lighting device 400. Calibration values may be stored for each of the emitters 411, 412, 413, 414 and/or the detectors 416, 418 of each of the emitter modules 410. For example, calibration values may be stored for measured values of luminous flux (e.g., in lumens), x-chromaticity coordinate, y-chromaticity coordinate, emitter forward voltage, photodiode current, and detector forward voltage. For example, the luminous flux, x-chromaticity coordinate, and y-chromaticity coordinate measurements may be obtained from the emitters 411, 412, 413, 414 using an external calibration tool, such as a spectrophotometer. The values for the emitter forward voltages, photodiode currents, and detector forward voltages may be measured internally to the lighting device 400. The calibration values for each of the emitters 411, 412, 413, 414 and/or the detectors 416, 418 may be measured at a plurality of different drive currents, e.g., at 100%, 30%, and 10% of a maximum drive current for each respective emitter.

In addition, the calibration values for each of the emitters 411, 412, 413, 414 and/or the detectors 416, 418 may be measured at a plurality of different operating temperatures. The lighting device 400 may be operated in an environment that is controlled to multiple calibration temperatures and values of the operational characteristics may be measured and stored. For example, the lighting device 400 may be operated at a cold calibration temperature, such as room temperature (e.g., approximately 25° C.), and a hot calibration temperature (e.g., approximately 85° C.) At each temperature, the calibration values for each of the emitters 411, 412, 413, 414 and/or the detectors 416, 418 may be measured at each of the plurality of drive currents and stored in the memory 446.

After installation, the lighting device control circuit 440 of the lighting device 400 may use the calibration values stored in the memory 446 to maintain a constant light output from the emitter module(s) 410. The lighting device control circuit 440 may determine target values for the luminous flux $L_E$ to be emitted from the emitters 411, 412, 413, 414 to achieve the target intensity $L_{TRGT}$ and/or the target color temperature $T_{TRGT}$ for the lighting device 400. The lighting device control circuit 440 may determine the magnitudes for the respective drive currents $I_{LED1}$-$I_{LED4}$ for the emitters 411, 412, 413, 414 based on the determined target values for the luminous flux $L_E$ to be emitted from the emitters 411, 412, 413, 414. When the age of the lighting device 400 is zero, the magnitudes of the respective drive currents $I_{LED1}$-$I_{LED4}$ for the emitters 411, 412, 413, 414 may be controlled to initial magnitudes $I_{LED-INITIAL}$.

The light output of the emitter modules 410 may decrease as the emitters 411, 412, 413, 414 age. The lighting device control circuit 440 may be configured to increase the magnitudes of the drive current IDR for the emitters 411, 412, 413, 414 to adjusted magnitudes $I_{LED-ADJUSTED}$ to achieve the determined target values for the luminous flux $L_E$ of the target intensity $L_{TRGT}$ and/or the target color temperature $T_{TRGT}$. Methods of adjusting the drive currents of emitters to achieve a constant light output as the emitters age are described in greater detail in U.S. Patent Application Publication No. 2015/0382422, published Dec. 31, 2015, entitled ILLUMINATION DEVICE AND AGE COMPENSATION METHOD, the entire disclosure of which is hereby incorporated by reference.

Figure 5A:
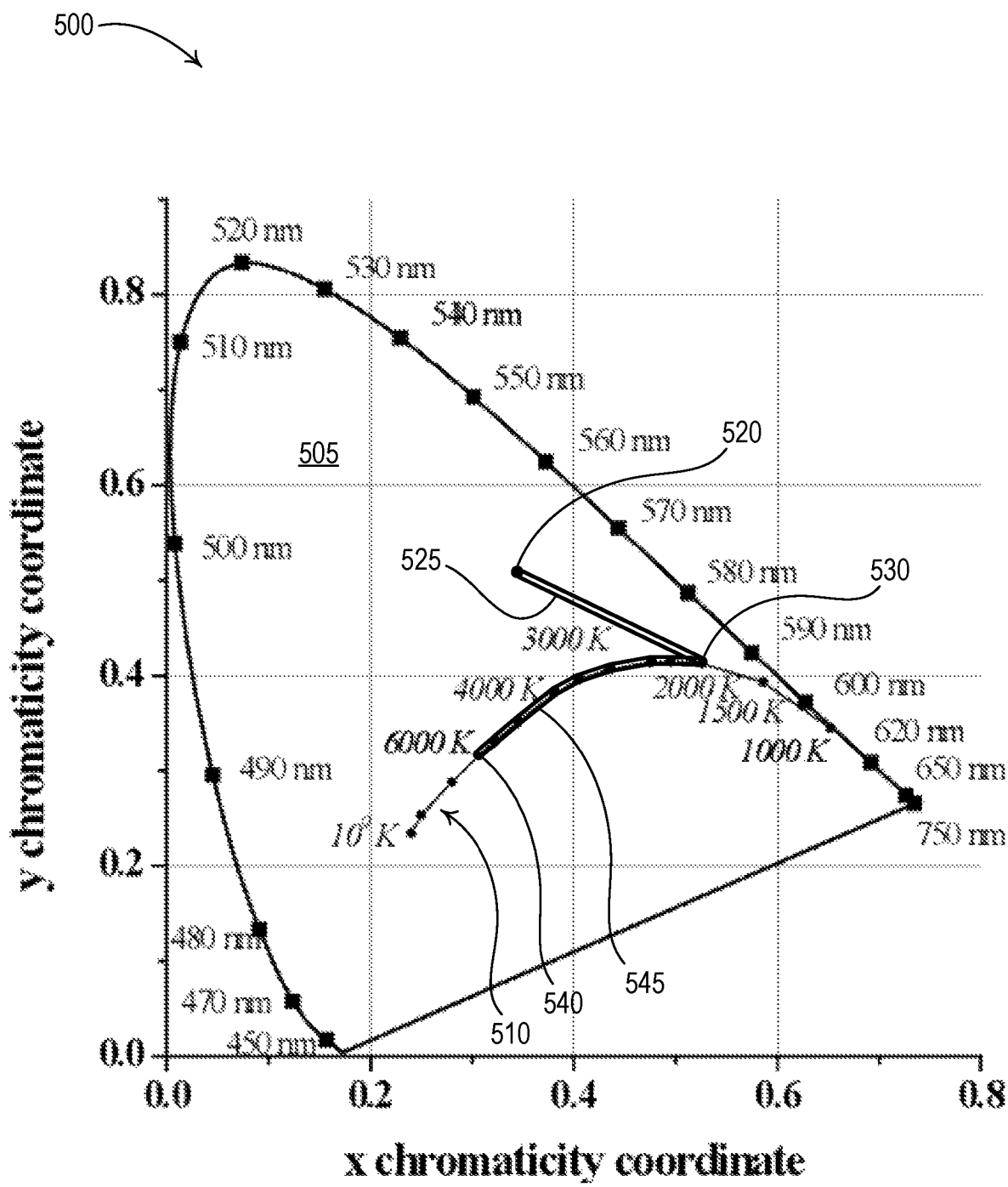
FIG. 5A depicts an international commission on illumination (CIE) 1931 color space chart depicting a black body curve.

FIG. 5A depicts an International Commission on Illumination (CIE) 1931 color space chart 500 depicting a color space 505 and a black body curve 510. The color space 505 may represent a two-dimensional space (e.g., an XY chromaticity space) where colors may be indicated by an x-chromaticity coordinate and a y-chromaticity coordinate. The black body curve 510 may represent a one-dimensional space (e.g., a CCT chromaticity space) where colors may be indicated by a color temperature value (e.g., from 1400 K to 10,000 K). The chart 500 depicts example color adjustments between colors on the black body curve 510 and between colors on and off the black body curve 510. A color within a predetermined threshold value of the black body curve 510 may be considered to be on the black body curve 510. A color farther from the black body curve 510 than the predetermined threshold value may be considered to be off the black body curve 510. The predetermined threshold may be determined such that it is within one MacAdam ellipse of the black body curve 510. The predetermined threshold value may be a delta UV (Duv) value (e.g., a delta UV value of 0.05). The predetermined threshold value may be a function of illuminance. For example, as an illuminance value (e.g., of a lighting device) decreases, the predetermined threshold value may increase.

A lighting device (e.g., such as the lighting device 100 shown in FIG. 1, the lighting device 200 shown in FIG. 2, or the lighting device 400 shown in FIG. 4) may be controlled to emit light having a first color 520, which may be referred to as an initial color $C_{INIT}$. The lighting device may receive a message indicating a second color 530, which may be referred to as a destination color $C_{DEST}$. The lighting device may determine whether the first color 520 and/or the second color 530 are on the black body curve 510. For example, as shown in FIG. 5A, the first color 520 may not be on the black body curve 510 and the second color 530 may be on the black body curve 510. The lighting device may need to convert the second color 530 from the CCT chromaticity space to the XY chromaticity space (e.g., as described herein). When the first color 520 and/or the second color 530 are not be on the black body curve 510, the lighting device may determine to adjust (e.g., linearly adjust in the XY chromaticity space) the light emitted from the lighting device from the first color 520 to the second color 530 (e.g., from the first color 520 to the black body curve 510). For example, the light emitted by the lighting device may be adjusted (e.g., faded) along a first path 525 from the first color 520 to the second color 530. The first path 525 may be a straight line between the first color 520 and the second color 530.

In addition, the lighting device may be controlled to emit light having a third color 540. In this example, the third color 540 may be referred to as an initial color $C_{INIT}$. The lighting device may receive the message indicating the second color 530, which may be referred to as a destination color $C_{DEST}$. The lighting device may determine that the third color 540 and the second color 530 are on the black body curve 510. The lighting device may need to convert the second color 530 and/or the third color 540 from the CCT chromaticity space to the XY chromaticity space (e.g., as described herein). When the initial color $C_{INIT}$ (e.g., the third color 540) and the destination color $C_{DEST}$ (e.g., the second color 530) are determined to be on the black body curve 510, the lighting device may determine to adjust the light emitted from the lighting device from the third color 540 to the second color 530 along the black body curve 510 (e.g., in the CCT chromaticity space). For example, the light emitted by the lighting device may be adjusted along a second path 545 that extends from the third color 540 to the second color 530 along the black body curve 510. The second path 545 may be configured to remain within the predetermined threshold of the black body curve 510.

Figure 5B:
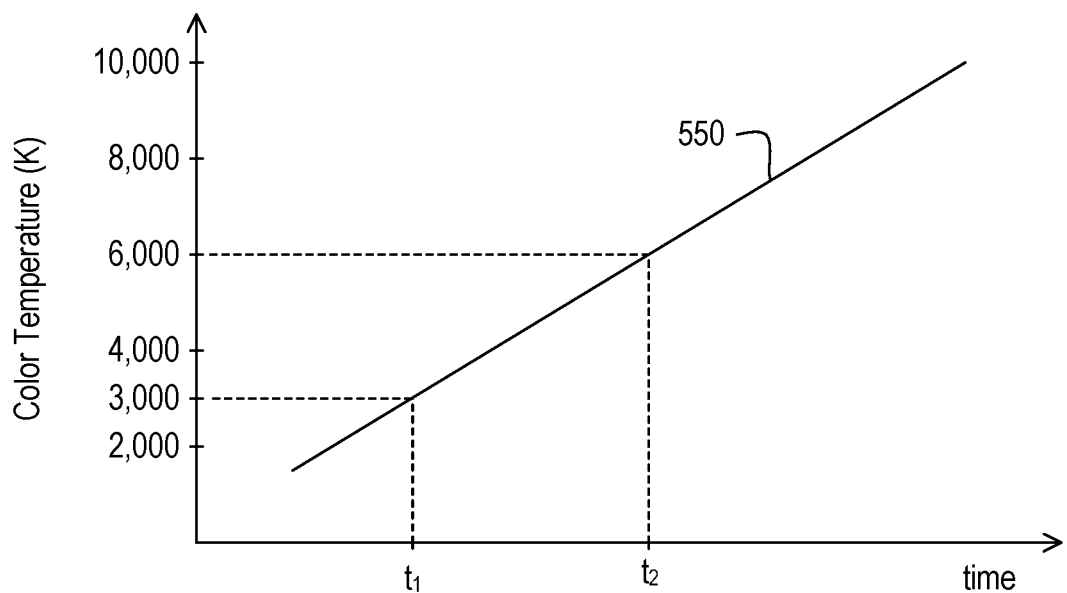
FIG. 5B depicts an example linear relationship between color temperature and time for adjusting a color temperature of light emitted by a lighting device based on the black body curve shown in FIG. 5A.

When the initial color $C_{INIT}$ and the destination color $C_{DEST}$ are both on the black body curve 510, the lighting device may be configured to adjust (e.g., fade) the light emitted from the lighting device along the black body curve 510 (e.g., in the CCT chromaticity space) according to a relationship between color (e.g., color temperature) and time. For example, the lighting device may be configured to adjust the color temperature to which the lighting device is controlling the light emitted from the lighting device along the black body curve 510 according to a linear relationship between color temperature and time. FIG. 5B depicts an example linear relationship 550 between color temperature and time for adjusting a color temperature of light emitted by a lighting device based on the black body curve 510. As shown in FIG. 5B, the color temperature may be adjusted from a warm-white color temperature $CCT_{WW}$ (e.g., approximately 1400 K) at one end of the linear relationship 550 to a cool-white color temperature $CCT_{CW}$ (e.g., approximately 10,000 K) at the other end. For example, the lighting device may be configured to update the color temperature of the light emitted by the lighting device on a periodic basis at an update period (e.g., every half-cycle of the AC power source to which the lighting device is coupled). According to the linear relationship 550 between color temperature and time, the lighting device may be configured to adjust the color temperature by a constant amount (e.g., steps) per update period. The constant amount of color temperature adjustment per update period may be associated with a particular command to fade the light emitted by the lighting device from the initial color $C_{INIT}$ to the destination color $C_{DEST}$. For example, the lighting device may determine the amount of color adjustment per update period based on the difference between the initial color $C_{INIT}$ and the destination color $C_{DEST}$ and/or the update period. For example, if the lighting device is initially emitting light at a color temperature of 3000K and receives a command to fade the light emitted to a color temperature of 6000K over a fade period of one minute, the lighting device may linearly adjust the color temperature with respect to time from 3000K at time $t_1$ (e.g., zero seconds) to 6000K at time $t_2$ (e.g., sixty seconds) as shown in FIG. 5B.

When adjusting the color temperature as defined by the linear relationship 550 between color temperature and time, the lighting device may convert the color temperature from the CCT chromaticity space to the XY chromaticity space during each update period before controlling the light emitted from the lighting device. As shown in FIG. 5A, the color temperatures on the black body curve 510 near the cool-white color temperature $CCT_{CW}$ (e.g., 10,000 K) are closer together in the XY chromaticity space than color temperatures near the warm-white color temperature $CCT_{WW}$ (e.g., 1400K). In other words, the constant amounts of adjustment of the color temperature in the CCT chromaticity space per update period when using the linear relationship 550 may result in varying amounts of adjustment of the color in the XY chromaticity space (e.g., larger steps in the color in the XY chromaticity space near the warm-white color temperatures and smaller steps in the color in the XY chromaticity space near the cool-white color temperatures). As the lighting device is fading the color temperature by the constant amounts in the CCT chromaticity space, the color of the light emitted by the lighting device (e.g., as perceived by the human eye) may transition more quickly through the warm-white color temperatures than the cool-white color temperatures (e.g., a perceived change in the color temperature may be non-linear with respect to time).

Figure 5C:
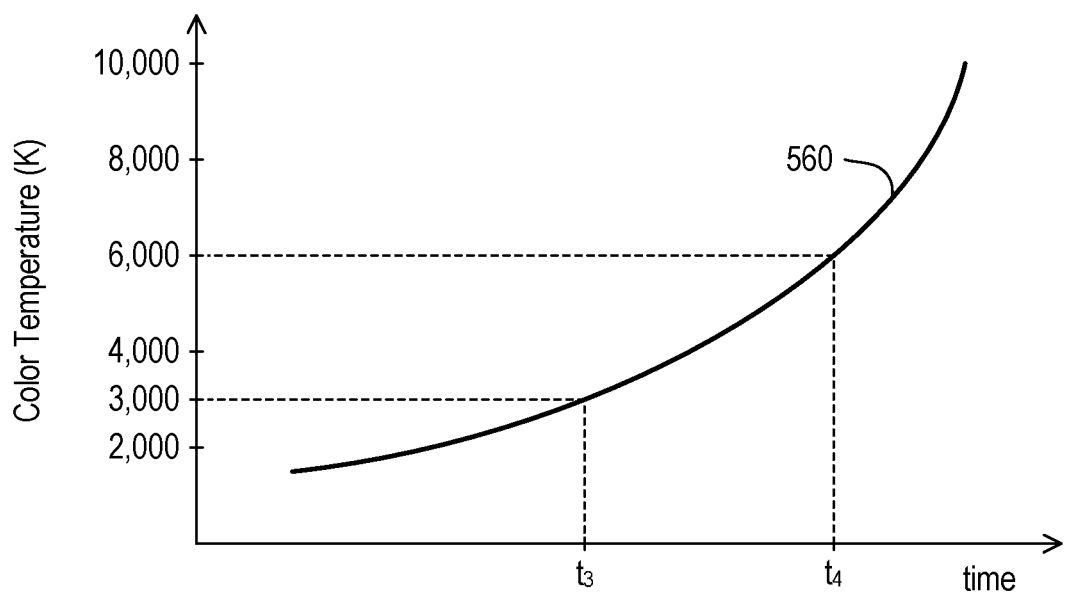
FIG. 5C depicts an example non-linear relationship between color temperature and time for adjusting a color temperature of light emitted by a lighting device based on the black body curve shown in FIG. 5A.

The lighting device may be configured to adjust (e.g., fade) the light emitted from the lighting device along the black body curve 510 according to a non-linear relationship between color (e.g., color temperature) and time, for example, to cause the perceived change in the color temperature to be approximately linear with respect to time. FIG. 5C depicts an example non-linear relationship 560 between color temperature and time for adjusting a color temperature of light emitted by a lighting device based on the black body curve 510. For example, the lighting device may be configured to adjust the light emitted from the lighting device along the black body curve 510 according to the non-linear relationship 560 between color temperature and time that may provide for higher resolution near the warm-white color temperatures than near the cool-white color temperatures. Stated differently, the non-linear relationship 560 may be configured to avoid abrupt changes in perceived color that may be perceived using the linear relationship 550 during the fade from an initial color temperature at an initial time to a target color temperature at a target time. The non-linear relationship 560 may include an exponential relationship defined by an exponential curve, a square law relationship defined by a square law curve, and/or another non-linear relationship. As shown in FIG. 5C, the color temperature may be adjusted from the warm-white color temperature $CCT_{WW}$ (e.g., approximately 1500 K) at one end of the non-linear relationship 560 to the cool-white color temperature $CCT_{CW}$ (e.g., approximately 10,000 K) at the other end. According to the non-linear relationship 560 between color temperature and time, the lighting device may be configured to adjust the color temperature by a variable amount per update period. For example, the lighting device may determine the amount of color adjustment for each update period based on the non-linear relationship 560 and/or the update period. When using the non-linear relationship 550 between color temperature and time to fade the light emitted by the lighting device from an initial color $C_{INIT}$ to a destination color $C_{DEST}$, the lighting device may be configured to provide smaller changes in color temperature per update period near the warm-white color temperatures than near the cool-white color temperatures. For example, if the lighting device is initially at a color temperature of 3000K and receives a command to fade to a color temperature of 6000K over a fade period of one minute, the lighting device may adjust the color temperature according to the non-linear relationship 560 with respect to time from 3000K at time $t_3$ (e.g., zero seconds) to 6000K at time $t_4$ (e.g., sixty seconds) as shown in FIG. 5C. The varying amounts of adjustment of the color temperature in the CCT chromaticity space per update period when using the non-linear relationship 560 may be sized such that the resulting amounts of adjustment of the color in the XY chromaticity space are approximately constant (e.g., the perceived change in the color temperature may be approximately linear with respect to time).

Figure 6:
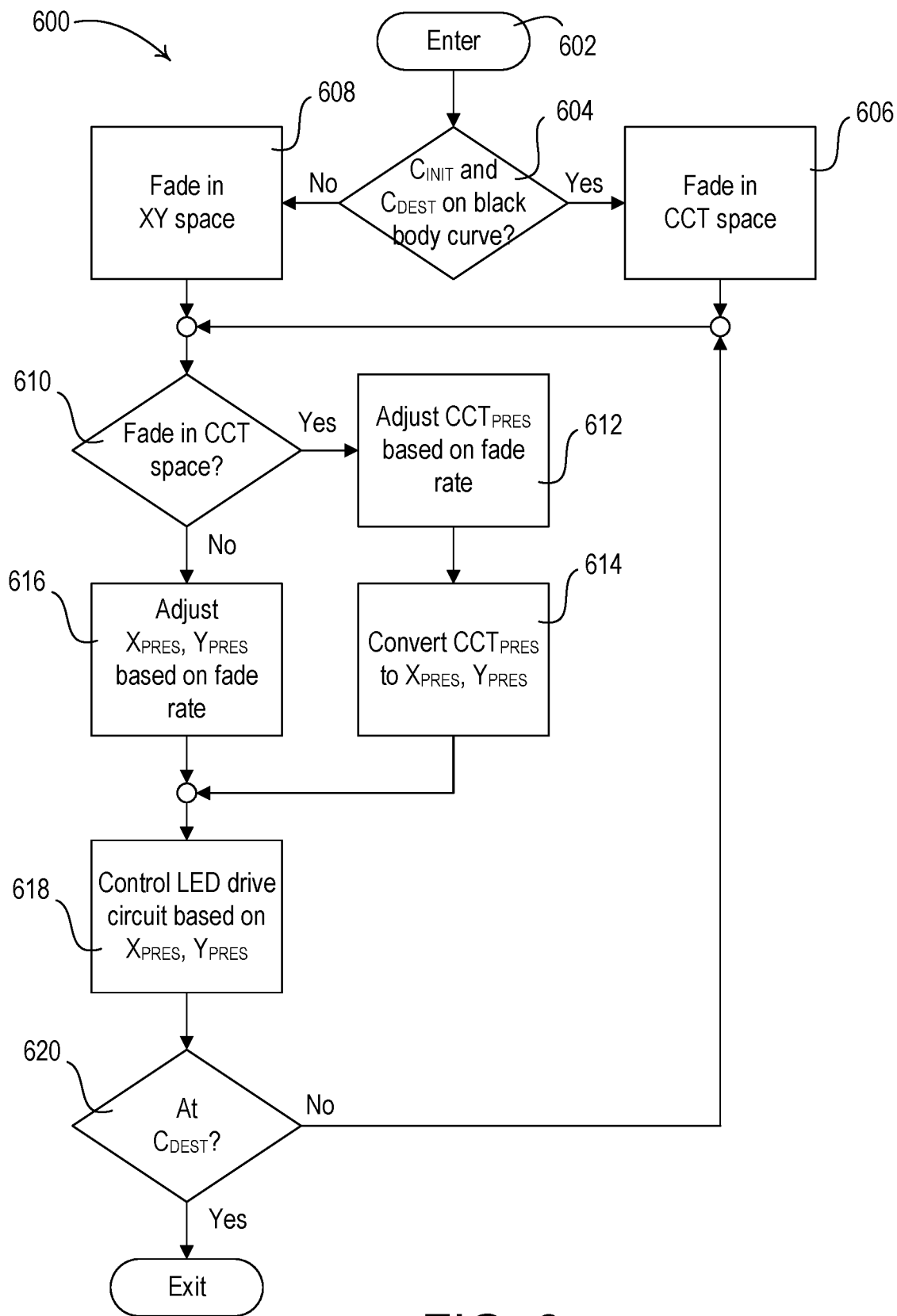
FIG. 6 is a flowchart depicting an example control procedure for adjusting a color of light emitted by a lighting device based on the black body curve shown in FIG. 5A.

FIG. 6 is a flowchart depicting an example control procedure 600 for adjusting a color of light emitted by a lighting device based on a black body curve (e.g., the black body curve 510 shown in FIG. 5A). The control procedure 600 may be executed as part of a control procedure (e.g., a color control procedure). The control procedure 600 may be implemented by one or more devices. For example, the control procedure 600 may be executed by a control circuit (e.g., the lighting device control circuit 440 shown in FIG. 4) of a lighting device (e.g., such as the lighting device 100 shown in FIG. 1, the lighting device 200 shown in FIG. 2, or the lighting device 400 shown in FIG. 4) to adjust a color of light emitted by the lighting device. For example, the control procedure 600 may be executed at 602 by the lighting device that is emitting light having a first color (e.g., an initial color $C_{INIT}$).

The control procedure 600 may be executed at 602 in response to receipt of a message (e.g., a digital message) indicating a second color (e.g., a destination color $C_{DEST}$) that is different than the first color. The second color may be indicated in (e.g., reference a value in) an XY chromaticity space, a Correlated Color Temperature (CCT) chromaticity space, a UVW color space, a RGB color space, or another color space. When the second color is indicated in the XY chromaticity space, the message may include an x-chromaticity coordinate and a y-chromaticity coordinate that indicates the second color. When the second color is indicated in the CCT chromaticity space, the message may include a CCT value of the second color. When the second color is indicated in the UVW color space, the message may include u-chromaticity, a v-chromaticity, and a lightness index (e.g., w). When the second color is indicated in the CCT chromaticity space, the message may include a CCT value of the second color. When the second color is indicated in the RGB color space, the message may include a red x-chromaticity coordinate, a red y-chromaticity coordinate, a green x-chromaticity coordinate, a green y-chromaticity coordinate, a blue x-chromaticity coordinate, and a blue y-chromaticity coordinate that indicate the second color. The message may include a fade request. The fade request may indicate fade information. The fade information may include a fade rate, a fade duration, an adjustment interval, and/or an adjustment magnitude (e.g., a step, increment/decrement change in color per adjustment interval).

At 604, the lighting device may determine whether the first color and/or the second color are on the black body curve. The lighting device may determine that a color is on the black body curve when that color is within a threshold value from the black body curve (e.g., within one MacAdam ellipse of the colors on the black body curve). The threshold value may be a delta UV (Duv) value (e.g., a delta UV value of 0.05). At 606, the lighting device may determine to fade in the CCT chromaticity space, when the first color and the second color are on the black body curve. Further, at 606, the lighting device may set a present CCT chromaticity value $CCT_{PRES}$ based on the CCT chromaticity value associated with the initial color $C_{INIT}$, and may determine a destination CCT chromaticity value $CCT_{DEST}$ based on the CCT chromaticity value associated with the destination color $C_{DEST}$.

At 610, the lighting device may determine whether to fade in the CCT chromaticity space. If the lighting device determines at 610 to fade in the CCT chromaticity space, the lighting device may adjust at 612 the color temperature (e.g., the present CCT chromaticity value $CCT_{PRES}$) of the light emitted by the lighting device in the CCT chromaticity space. For example, a control circuit of the lighting device may be configured to perform at 612 a fade (e.g., a linear fade or a non-linear fade) in the CCT chromaticity space. The control circuit may be configured to control the lighting load such that the light emitted by the lighting device is adjusted from the first color to the second color by performing the fade in the CCT chromaticity space (e.g., according to the linear relationship 550 or the non-linear relationship 560 between color temperature and time). The color temperature may be adjusted (e.g., iteratively) based on the fade information received in the message. Alternatively, the lighting device may determine the fade information (e.g., to use for the fade) based on one or more factors. The one or more factors may include a time of day, a time associated with the second color, a user configured fade rate, the linear relationship 550, the non-linear relationship 560, an update period, and/or the like. The lighting device may be preconfigured to use the non-linear relationship 560 to fade, at 612. The lighting device may determine to switch from the non-linear relationships 560 to the linear relationship 550 to fade, at 612.

In examples, the lighting device may determine whether to use the linear relationship 550 or the non-linear relationship 560 to fade in the CCT chromaticity space, for example, based on an estimated perceived change in color. For example, the lighting device may determine whether to use the linear relationship 550 or the non-linear relationship 560 such that the color temperature change during the fade is approximately linear with respect to time. In examples, the lighting device may determine an estimated perceived change in color between a current color and a target color using the linear relationship 550 and non-linear relationship 560. The lighting device may choose the linear relationship 550 or the non-linear relationship 560 based on which respective estimated perceived change in color between the current color and the target color is closer to a linear perceived change in color. The lighting device may be configured to select the linear relationship 550 when the perceived changes in color temperature are substantially continuous. For example, the lighting device may be configured to select the non-linear relationship 560 when using the linear relationship 550 would result in discontinuous perceived changes in color temperature. In examples, the lighting device may determine whether to use the linear relationship 550 or the non-linear relationship 560 to fade in the CCT chromaticity space, for example, based on a delta CCT value (e.g., the difference between a current color temperature and a target color temperature). When the delta CCT is below a threshold delta (e.g., 1000K), the lighting device may determine to use the linear relationship 550 to fade. For example, when the delta CCT is below the threshold delta, fading using the linear relationship 550 may appear the same to a user (e.g., have the same perceived change in color) as fading using the non-linear relationship 560. When the delta CCT is greater than or equal to the threshold delta, the lighting device may determine to use the non-linear relationship 560 to fade.

When fading in the CCT chromaticity space along the black body curve, the lighting device may determine a plurality of CCT chromaticity values along the black body curve between the first color temperature and the second color temperature. The plurality of CCT chromaticity values may be associated with the fade (e.g., the fade information). An number of CCT chromaticity values (e.g., steps or ticks) during the fade may be determined based on one or more factors, for example, such as a fade duration, a difference between the first color temperature and the second color temperature, a relationship between color temperature and time (e.g., linear or non-linear) and/or the like. For example, the lighting device may adjust (e.g., iteratively) the present CCT chromaticity value $CCT_{PRES}$ of the plurality of CCT chromaticity values to a next CCT chromaticity value of the plurality of CCT chromaticity values along the black body curve. The lighting device may repeat the loop 610, 612, 614, 618, and 620 for the remaining CCT chromaticity values until the second color (e.g., last CCT chromaticity value of the plurality of CCT chromaticity values) is reached. The last CCT chromaticity value of the plurality of CCT chromaticity values may be the CCT chromaticity value associated with the second color (e.g., the destination color $C_{DEST}$).

At 612, the lighting device may adjust the present CCT chromaticity value $CCT_{PRES}$ based on the fade information. The first time the lighting device enters 612, the present CCT chromaticity value $CCT_{PRES}$ is equal to the CCT chromaticity value associated with the initial color $C_{INIT}$. When determining how to adjust the present CCT chromaticity value $CCT_{PRES}$ based on the fade information, the lighting device may determine the fade duration (e.g., 3 seconds), the adjustment magnitude, a fade rate, and/or an adjustment interval. The fade duration may define an allotted time to fade from the initial color $C_{INIT}$ to the destination color $C_{DEST}$. The adjustment interval may be how often (e.g., an amount of time or period) the lighting device periodically adjusts the lighting load across the fade duration. In some examples, adjustment interval may be set to equal the length of one line cycle of the AC mains line voltage, so 16.67 ms when operating in a 60 Hz system or every 20 ms when operating in a 50 Hz system. The adjustment magnitude may define a size of a step change (e.g., ΔCCT) for each adjustment interval. The adjustment magnitude may be determined based on $C_{INIT}$, $C_{DEST}$, the fade duration, and/or the adjustment interval. The fade rate may be a measure of how quickly each color adjustment is performed (e.g., adjustment magnitude divided by adjustment interval). At 612, the lighting device may adjust the present CCT chromaticity value $CCT_{PRES}$ by the adjustment magnitude along the black body curve that is based on the fade duration and/or the adjustment interval. Taking an example where the fade duration is 3 seconds and the adjustment interval is 16.67 ms, at 612 the lighting device may adjust the present CCT chromaticity value $CCT_{PRES}$ by a step change that is equal to approximately $1/180^{th}$ of the path between the present CCT chromaticity value $CCT_{PRES}$ and the destination CCT chromaticity value $CCT_{DEST}$. Further, in this example, the lighting device may perform the loop 610, 612, 614, 618, and 620 and adjust $CCT_{PRES}$ approximately 180 times over 3 seconds for the present CCT chromaticity value $CCT_{PRES}$ to be equal to the destination CCT chromaticity value $CCT_{DEST}$.

At 614, the lighting device may convert the adjusted present CCT chromaticity value $CCT_{PRES}$ determined at 612 from the CCT chromaticity space to the XY chromaticity space to determine a present X chromaticity value $X_{PRES}$ and a present Y chromaticity value $Y_{PRES}$. The adjusted present CCT chromaticity value $CCT_{PRES}$ may be converted to the XY chromaticity space based on one or more (e.g., a set of) equations stored in a memory of the lighting device. The adjusted present CCT chromaticity value $CCT_{PRES}$ may be converted to the XY chromaticity space based on a look up table stored in the memory of the lighting device. The lighting device may be configured to convert the adjusted present CCT chromaticity value $CCT_{PRES}$ into the uv chromaticity space to determine a present uv chromaticity value (e.g., a present u chromaticity value $U_{PRES}$ and a present v chromaticity value $V_{PRES}$), and then be configured to convert the present uv chromaticity value into the present XY chromaticity values.

At 618, the lighting device may control the drive circuit such that the light emitted by the lighting device is adjusted from the first color to the second color. For example, the drive circuit may control an LED drive circuit based on the present X chromaticity value $X_{PRES}$ and the present Y chromaticity value $Y_{PRES}$ at 618. The control circuit may send $X_{PRES}$ and $Y_{PRES}$ to an emitter module control circuit (e.g., such as the emitter module control circuit 436 shown in FIG. 4) to appropriately drive each of the LEDs (e.g., different color LEDs) of the lighting device. When the lighting device at 620 determines that the light emitted by the lighting devices is not at the second color (e.g., the present CCT chromaticity value $CCT_{PRES}$ does not equal the destination CCT chromaticity value $CCT_{DEST}$), the control procedure 600 may return to 610, and the control circuit may perform another iteration of adjusting the present X chromaticity value $X_{PRES}$ and the present Y chromaticity value $Y_{PRES}$. The lighting device may continue iteratively adjusting the present chromaticity values $X_{PRES}$ and the present Y chromaticity value $Y_{PRES}$ until they are equal to a destination X chromaticity value $X_{DEST}$ and a destination Y chromaticity value $Y_{DEST}$ determined at 608. For example, the lighting device may perform the loop 610, 612, 614, 618, and 620 and adjust the present CCT chromaticity value $CCT_{PRES}$ based on the adjustment interval and the adjustment magnitude until the present CCT chromaticity value $CCT_{PRES}$ is equal to the destination CCT chromaticity value $CCT_{DEST}$. Once the present CCT chromaticity value $CCT_{PRES}$ is equal to the destination CCT chromaticity value $CCT_{DEST}$, the control procedure 600 may exit.

If the lighting device determines that the first color or the second color are not on the black body curve at 604, then at 608, the lighting device may determine to fade in a XY chromaticity space. For example, the lighting device may determine to fade in the XY chromaticity space when the first color and/or the second color are not on the black body curve. In some examples at 608, the lighting device may set a present X chromaticity coordinate $X_{PRES}$ and a present Y chromaticity coordinate $Y_{PRES}$ based on the X and Y chromaticity coordinates associated with initial color $C_{INIT}$, respectively. Further, at 608, the lighting device may determine the destination X chromaticity coordinate $X_{DEST}$ and the destination Y chromaticity coordinate $Y_{DEST}$ based on the X and Y chromaticity coordinates associated with the destination color $C_{DEST}$. When the lighting device determines to fade in the XY chromaticity space at 610, the lighting device may adjust (e.g., iteratively) at 616 a present X chromaticity coordinate $X_{PRES}$ and a present Y chromaticity coordinate $Y_{PRES}$, for example, based on the fade duration, the adjustment magnitude, and an adjustment interval. The lighting device may continue iteratively adjusting the present X chromaticity coordinate $X_{PRES}$ and the present Y chromaticity coordinate $Y_{PRES}$ until they are equal to the destination X chromaticity coordinate $X_{DEST}$ and the destination Y chromaticity coordinate $Y_{DEST}$ determined at 608. For example, the control procedure 600 may end when the present X chromaticity coordinate $X_{PRES}$ and the present Y chromaticity coordinate $Y_{PRES}$ are equal to the destination X chromaticity coordinate $X_{DEST}$ and the destination Y chromaticity coordinate $Y_{DEST}$.

If the lighting device determines at 610 to not fade in the CCT chromaticity space, the lighting device may adjust the present X chromaticity coordinate $X_{PRES}$ and the present Y chromaticity coordinate $Y_{PRES}$ based on the fade duration and/or the adjustment interval at 616. After adjusting the present X chromaticity coordinate $X_{PRES}$ and the present Y chromaticity coordinate $Y_{PRES}$ at 616, the lighting device may control an LED drive circuit based on the present X chromaticity coordinate $X_{PRES}$ and the present Y chromaticity coordinate $Y_{PRES}$.

The lighting device may include one or more sensors (e.g., such as the detectors 312 shown in FIG. 3). At least one of the one or more sensors may be configured to measure a color of the light emitted by the lighting device. Alternatively, an external sensor may measure the color of the light emitted by the lighting device. The lighting device may receive, from the external sensor and/or a system controller, an indication of the color of the light emitted by the lighting device. At 620, the lighting device may be configured to determine whether the light emitted by the lighting device is at the second color (e.g., $C_{DEST}$). If the light emitted by the lighting device is measured at the second color, the control procedure 600 may end.

The lighting device may determine that the first color is off the black body curve (e.g., greater than the threshold value from the black body curve) and that the second color is on the black body curve. The lighting device may control, based on the first color being greater than the threshold value from the black body curve and the second color being on the black body curve, the drive circuit such that the light emitted by the lighting device is adjusted (e.g., adjusted linearly) toward the black body curve to a third color that is on the black body curve. The lighting device may then control the drive circuit such that the light emitted by the lighting device is adjusted along the black body curve between the third color and the second color using the control procedure 600 wherein the third color is the initial color and the second color is the destination color.

In examples, the lighting device may determine that the first color is on the black body curve and the second color is off the black body curve. The lighting device may control the drive circuit such that the light emitted by the lighting device is adjusted along the black body curve between the first color and an intermediate color using the control procedure 600 wherein the first color is the initial color and the intermediate color is the destination color. The lighting device may then control the drive circuit such that the light emitted by the lighting device is adjusted (e.g., adjusted linearly) away the black body curve to the second color that is off the black body curve.

Figure 7:
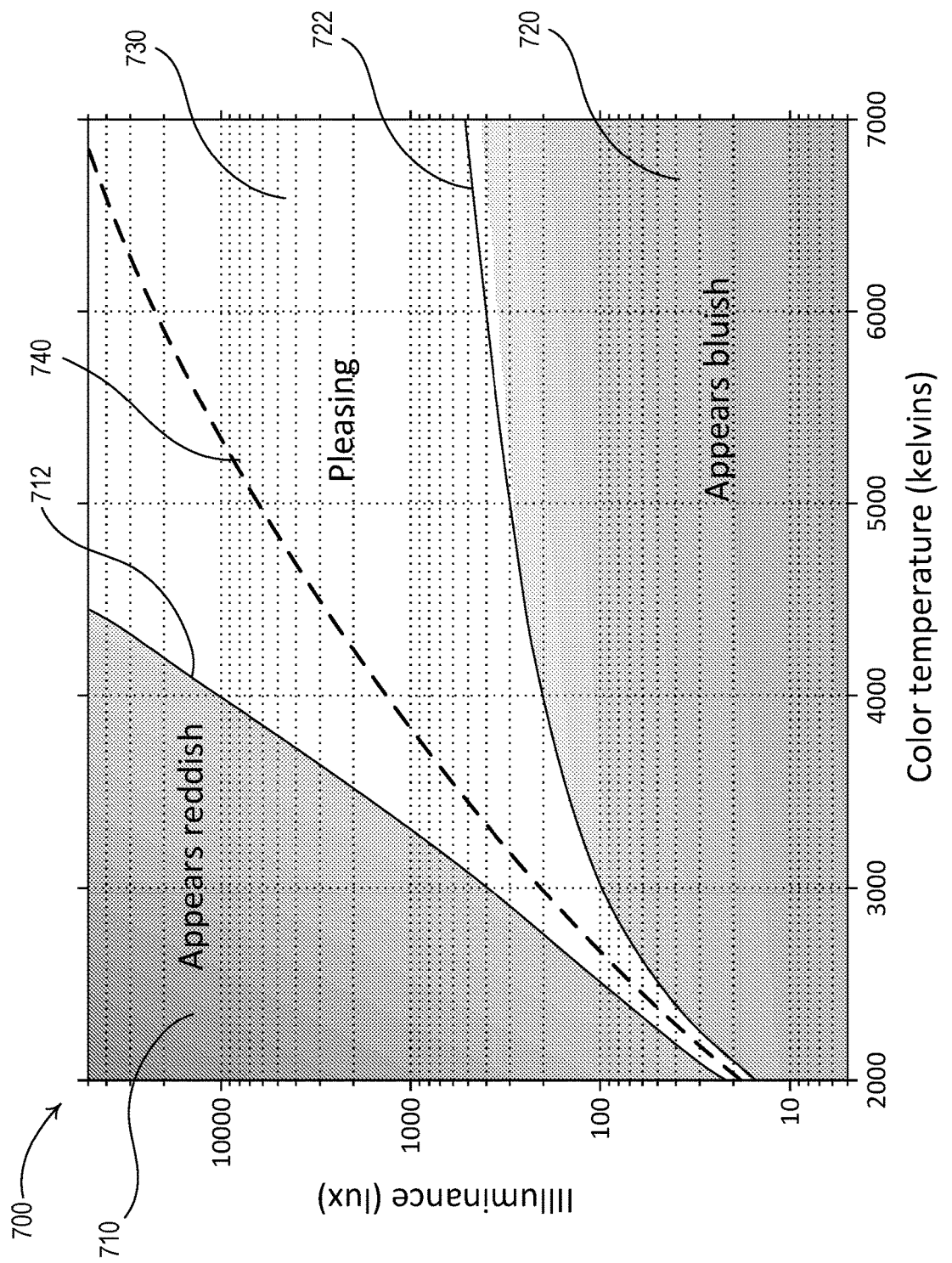
FIG. 7 is an illuminance vs. color temperature chart depicting example color appearances.

FIG. 7 is a chart 700 of illuminance vs. color temperature depicting example color appearances. The chart 700 may be preferred color temperature plot, such as a Kruithof curve, that depicts regions color temperatures that are often viewed as comfortable or pleasing to an observer (e.g., the human eye) at particular illuminance levels (e.g., light levels). The chart 700 may define a first region 710 where light appears reddish and is unpleasing to the human eye (e.g., the observer). The first region 710 may be defined by a first curve 712. The first curve 712 may be a CCT red boundary that defines respective threshold color temperatures, for various illuminance values, below which the emitted light appears reddish in color. The chart 700 may define a second region 720 where light appears bluish and is unpleasing to the human eye. The second region 720 may be defined by a second curve 722. The second curve 722 may be a CCT blue boundary that defines respective threshold color temperatures, for various illuminance values, above which the emitted light appears bluish in color. The chart 700 may define a third region 730 that is between the first region 710 and the second region 720. The third region 730 may be defined by the first curve 712 and the second curve 722. The third region 730 may define color temperatures between the first curve 712 and the second curve 722, for various illuminance values, that the emitted light is pleasing to the human eye.

A lighting device (e.g., such as the lighting device 100 shown in FIG. 1, the lighting device 200 shown in FIG. 2, and/or the lighting device 400 shown in FIG. 4) may be configured to control the color temperature of the light emitted from the lighting device to maintain the color temperature in the pleasing region of a preferred color temperature plot (e.g., the third region 730 of the Kruithof curve shown in FIG. 7). For example, the lighting device may be configured to determine an illuminance level of the space illuminated by the lighting device and compare the determined illuminance level to a CCT red boundary (e.g., the first curve 712) and the CCT blue boundary (e.g., the second curve 714) to maintain the color temperature of the light emitted from the lighting device within the pleasing region.

The values of the CCT red boundary (e.g., the first curve 712) and the CCT blue boundary (e.g., the second curve 714) may be configurable. For example, the values of the CCT red boundary and the CCT blue boundary may be configured based on user preferences. A user may be able to use an application running on a computing device (e.g., a mobile device) to configure the values of the CCT red boundary and the CCT blue boundary, and the computing device may transmit the adjusted values of the CCT red boundary and the CCT blue boundary to the lighting device. For example, the user may select from a plurality of options (e.g., different options of color temperature preference plots and/or shapes and values of the CCT red boundary and the CCT blue boundary) displayed by the application running on the computer device. In addition, the user may utilize a wizard executed by the application running on the computer device to configure the values of the CCT red boundary and the CCT blue boundary. The user may configure the values of the CCT red boundary and the CCT blue boundary based on the preference of the user and/or based on the color of the environment (e.g., wall, furniture, etc.) that the lighting device is illuminating. Further, the values of the CCT red boundary and the CCT blue boundary may automatically be updated. For example, the lighting device may automatically configure (e.g., learn) the desired values of the values of the CCT red boundary and the CCT blue boundary in response to detecting changes in the color temperature of the lighting device as manually adjusted by a user (e.g., in response to actuations of buttons of a remote control device that is controlling the lighting device).

In addition, the lighting device may be configured to determine an illuminance level of the space that is illuminated by the lighting device, and control the color temperature of the light emitted from the lighting device based on (e.g., as a function of) the determined illuminance level. For example, the lighting device may be configured to control the color temperature of the light emitted from the lighting device along a CCT-illuminance curve 740 as shown in FIG. 7. The values of the CCT-illuminance curve 740 may be set equal to the median value between the CCT red boundary and the CCT blue boundary for values of the illuminance that are less than a threshold illuminance (e.g., approximately 500 lumens as shown in FIG. 7). The values of the CCT-illuminance curve 740 may be stored in memory in the lighting device. In addition, the values of the CCT-illuminance curve 740 may be configured by a user and/or automatically configured by the lighting devices in a similar manner as the values of the CCT red boundary and the CCT blue boundary may be configured as described above.

Figure 8A:
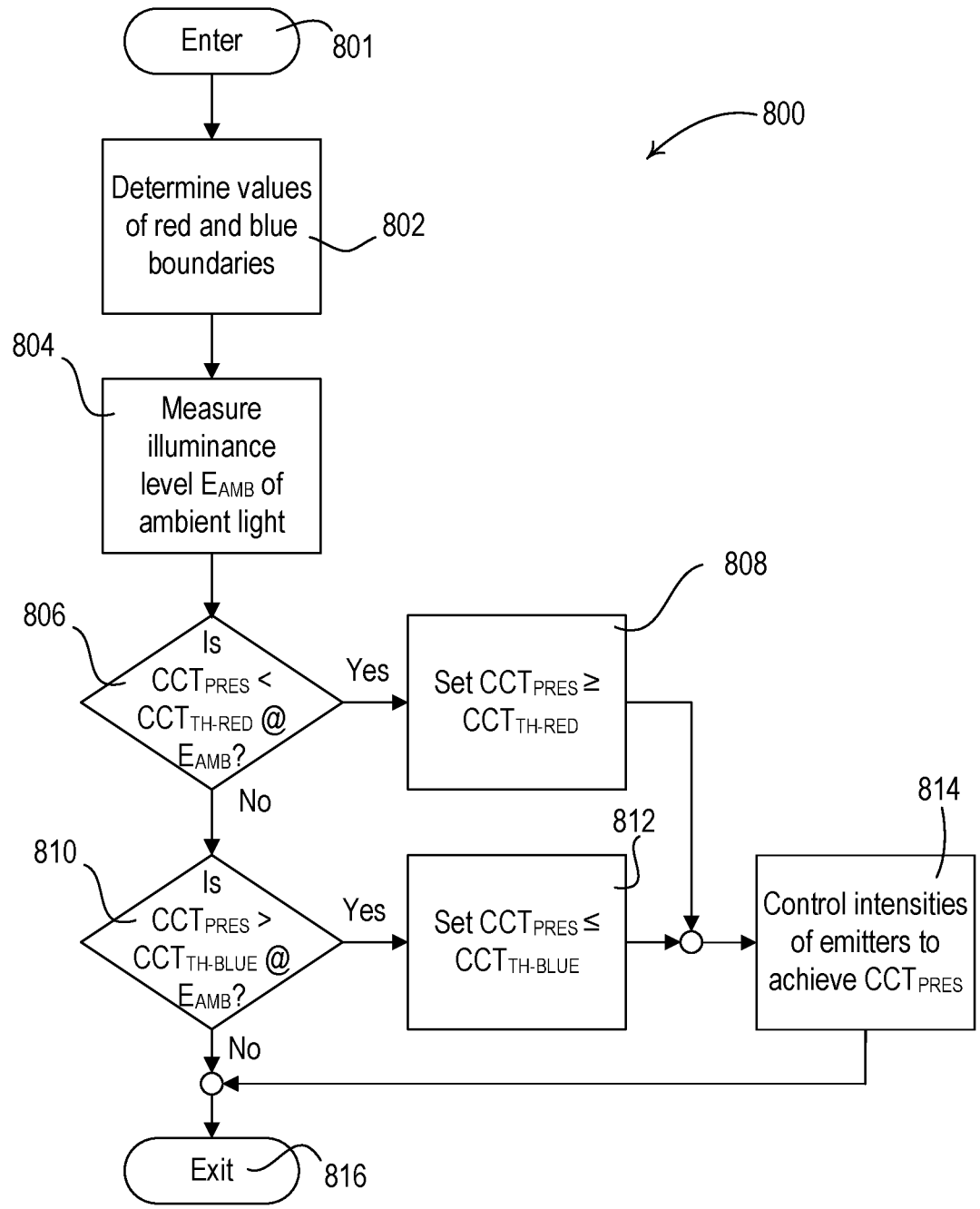
FIGS. 8A and 8B are a flowcharts depicting example control procedures for adjusting a color (e.g., a color temperature) of light emitted by a lighting device based on an illuminance level (e.g., a light level) of ambient light.

FIG. 8A is a flowchart depicting an example control procedure 800 for adjusting a color (e.g., a color temperature) of light emitted by a lighting device based on an illuminance level (e.g., a light level) of ambient light within a space in which the lighting device is installed. The control procedure 800 may be executed as part of a color control procedure. The control procedure 800 may be implemented by one or more devices. For example, the control procedure 800 may be executed by a control circuit of a lighting device (e.g., such as a control circuit of the lighting device 100 shown in FIG. 1, a control circuit of the lighting device 200 shown in FIG. 2, and/or the lighting device control circuit 440 of the lighting device 400 shown in FIG. 4), a control circuit of a remote control device, and/or a control circuit of a system controller to adjust a color (e.g., a present color temperature $CCT_{PRES}$) of light emitted by the lighting device. For example, the control circuit may execute the control procedure 800 periodically at 801. In addition, the control circuit may execute the control procedure 800 at 801 in response to a change in the illuminance level of the ambient light and/or a change in a target intensity of the lighting device. The control circuit may execute the control procedure 800 to ensure that the light in a space is pleasing (e.g., within region 730 of the chart 700 shown in FIG. 7), for example, to a user. The light in the space may be considered pleasing if it does not appear too reddish or bluish.

At 802, the control circuit may determine the values of a CCT red boundary (e.g., the first curve 712 shown in FIG. 7) and a CCT blue boundary (e.g., the second curve 714 shown in FIG. 7) on an illuminance vs. CCT chart (e.g., the chart 700 shown in FIG. 7). For example, the values of the CCT red boundary and the CCT blue boundary may be stored in memory on the lighting device and the control circuit may retrieve the values of the CCT red boundary and the CCT blue boundary from memory at 802. The values of the CCT red boundary and the CCT blue boundary may be fixed values and/or may be configurable values. For example, a user may configure the values of the CCT red boundary and the CCT blue boundary using a computing device, and the configured values may be transmitted to the lighting device and stored in memory. In addition, the control circuit may automatically configure (e.g., learn) the values of the CCT red boundary and the CCT blue boundary, for example, in response to detecting changes in the color temperature of the lighting device as manually adjusted by a user.

At 804, the control circuit may determine an illuminance level $E_{AMB}$ of ambient light proximate to the lighting device. The ambient light may be proximate to the lighting device if it is in the same space (e.g., room) as the lighting device. The lighting device may include one or more sensors (e.g., such as the detectors 312 shown in FIG. 3) configured to measure the illuminance level $E_{AMB}$ of the ambient light. The control circuit may receive an indication of the illuminance level $E_{AMB}$ of the ambient light proximate to the lighting device. The indication of the illuminance level $E_{AMB}$ of the ambient light may be received from the one or more sensors. The control circuit may be configured to determine the illuminance level $E_{AMB}$ of the ambient light in response to the sensors. Alternatively and/or additionally, the indication of the illuminance level $E_{AMB}$ of the ambient light may be received via a wireless communication circuit of the lighting device (e.g., from an external sensor).

At 806, the control device may determine whether the present color temperature $CCT_{PRES}$ (e.g., to which the control circuit is controlling the light emitted by the lighting device) is less than a red threshold temperature $CCT_{TH-RED}$ at the determined illuminance level $E_{AMB}$. The red threshold temperature $CCT_{TH-RED}$ may represent a value on the CCT red boundary. The CCT red boundary may define respective threshold color temperatures for various illuminance values below which the emitted light appears reddish in color. In addition, the red threshold temperature $CCT_{TH-RED}$ may be offset from the CCT red boundary (e.g., to provide a buffer between the threshold temperature and the unpleasant area). The unpleasant area may be larger or smaller than the area shown in FIG. 7 for different users. The buffer may ensure that the red threshold temperature $CCT_{TH-RED}$ remains outside of the unpleasant area for other users (e.g., with larger unpleasant areas). For example, the red threshold temperature $CCT_{TH-RED}$ may be offset from the CCT red boundary at a specific illuminance value by an offset value. The offset value may be configured such that the red threshold temperature $CCT_{TH-RED}$ remains outside of the unpleasant area for various users and/or remains pleasing for minor changes in the illuminance level $E_{AMB}$ of the ambient light. For example, the red threshold temperature $CCT_{TH-RED}$ may be determined using a value on the CCT red boundary plus the offset value (e.g., a value greater than the first curve 712 shown in FIG. 7).

If the present color temperature $CCT_{PRES}$ is less than the red threshold temperature $CCT_{TH-RED}$ at the determined illuminance level $E_{AMB}$, the control circuit may control the lighting load at 808 to increase the present color temperature $CCT_{PRES}$ of the light emitted by the lighting device to be equal to or greater than the red threshold temperature $CCT_{TH-RED}$ at the determined illuminance level $E_{AMB}$. For example, the control circuit may at 808 set the present color temperature $CCT_{PRES}$ to be greater than the red threshold temperature $CCT_{TH-RED}$ at the determined illuminance level $E_{AMB}$ by a first offset amount $CCT_{OFFSET1}$ (e.g., $CCT_{PRES}=CCT_{TH-RED}+CCT_{OFFSET1}$). The first offset amount $CCT_{OFFSET1}$ may be determined such that there is a buffer between the red threshold temperature $CCT_{TH-RED}$ (e.g., a potentially reddish color) and the present color temperature $CCT_{PRES}$ (e.g., a potentially a pleasing color). For example, the first offset amount $CCT_{OFFSET1}$ may be determined such that the light emitted by the lighting device remains pleasing for minor changes in the illuminance level $E_{AMB}$ of the ambient light. After the control circuit sets the present color temperature $CCT_{PRES}$ to be greater than or equal to the red threshold temperature $CCT_{TH-RED}$ at the determined illuminance level $E_{AMB}$ at 808, the control circuit may control a drive circuit (e.g., the LED drive circuit 432) at 814 to control emitters (e.g., the emitters 411, 412, 413, 414) to respective intensities to cause the lighting device to emit light at present color temperature $CCT_{PRES}$ (e.g., as determined at 808). The control procedure 800 may then end to 816.

If the present color temperature $CCT_{PRES}$ is not less than the red threshold temperature $CCT_{TH-RED}$ at the determined illuminance level $E_{AMB}$, the control circuit may determine at 810 whether the present color temperature $CCT_{PRES}$ is greater than a blue threshold temperature $CCT_{TH-BLUE}$ at the determined illuminance level $E_{AMB}$. The blue threshold temperature $CCT_{TH-BLUE}$ may represent a value on a CCT blue boundary (e.g., the second curve 722 shown in FIG. 7) on an illuminance vs. CCT chart (e.g., the chart 700 shown in FIG. 7). The CCT blue boundary may define respective threshold temperatures for various illuminance values above which the emitted light appears bluish in color. In addition, the blue threshold temperature $CCT_{TH-BLUE}$ may be offset from the CCT blue boundary (e.g., to provide a buffer between the threshold temperature and the unpleasant area). The unpleasant area may be larger or smaller than the area shown in FIG. 7 for different users. The buffer may ensure that the blue threshold temperature $CCT_{TH-BLUE}$ remains outside of the unpleasant area for other users (e.g., with larger unpleasant areas). For example, the blue threshold temperature $CCT_{TH-BLUE}$ may be offset from the CCT blue boundary at a specific illuminance value by an offset value. The offset value may be configured such that the blue threshold temperature $CCT_{TH-BLUE}$ remains outside of the unpleasant area for various users and/or remains pleasing for minor changes in the illuminance level $E_{AMB}$ of the ambient light. The offset value for the blue threshold temperature $CCT_{TH-BLUE}$ may be the same as the offset value for the red threshold temperature $CCT_{TH-RED}$. The blue threshold temperature $CCT_{TH-BLUE}$ may represent a value on the CCT blue boundary minus an offset value (e.g., a value less than the second curve 722 shown in FIG. 7).

If the present color temperature $CCT_{PRES}$ is greater than the blue threshold temperature $CCT_{TH-BLUE}$ at the determined illuminance level $E_{AMB}$, the lighting device may control the lighting load at 812 to decrease the present color temperature $CCT_{PRES}$ of the light emitted by the lighting device to be equal to or less than the blue threshold temperature $CCT_{TH-BLUE}$ at the determined illuminance level $E_{AMB}$. For example, the control circuit may at 812 set the present color temperature $CCT_{PRES}$ to be less than the blue threshold temperature $CCT_{TH-BLUE}$ at the determined illuminance level $E_{AMB}$ by a second offset amount $CCT_{OFFSET2}$ (e.g., $CCT_{PRES}=CCT_{TH-BLUE}-CCT_{OFFSET2}$). The second offset amount $CCT_{OFFSET2}$ may be determined such that there is a buffer between the blue threshold temperature $CCT_{TH-BLUE}$ (e.g., a potentially bluish color) and the present color temperature $CCT_{PRES}$ (e.g., a potentially a pleasing color). For example, the second offset amount $CCT_{OFFSET2}$ may be determined such that the light emitted by the lighting device remains pleasing for minor changes in the illuminance level $E_{AMB}$ of the ambient light. After the control circuit sets the present color temperature $CCT_{PRES}$ to be less than or equal to the blue threshold temperature $CCT_{TH-BLUE}$ at the determined illuminance level $E_{AMB}$ at 808, the control circuit may control a drive circuit (e.g., the LED drive circuit 432) at 814 to control emitters (e.g., the emitters 411, 412, 413, 414) to respective intensities to cause the lighting device to emit light at present color temperature $CCT_{PRES}$ (e.g., as determined at 808). The control procedure 800 may then end to 816.

If the present color temperature $CCT_{PRES}$ is determined at 810 to be less than the blue threshold temperature $CCT_{TH-BLUE}$ at the determined illuminance level $E_{AMB}$, the control procedure 800 may end at 816. The control circuit may be configured to perform, using the one or more sensors, periodic measurements of the illuminance level of the ambient light proximate to the lighting device. The control circuit may determine that the illuminance level of the ambient light proximate to the lighting device has changed from a first illuminance level to a second illuminance level. The control circuit may repeat the control procedure 800 for the second illuminance level. For example, the control circuit may determine whether the change from the first illuminance level to the second illuminance level is greater than a predetermined threshold. When the difference between the second illuminance level and the first illuminance level is greater than the predetermined threshold, the lighting device may repeat the control procedure 800 for the second illuminance level to control the lighting load such that the present color temperature $CCT_{PRES}$ the light emitted by the lighting device is between the CCT red boundary and the CCT blue boundary at the second illuminance level. Alternatively and/or additionally, the control circuit may receive, via the wireless communication circuit, a message that indicates the change in the illuminance level that is greater than the predetermined threshold.

Figure 8B:
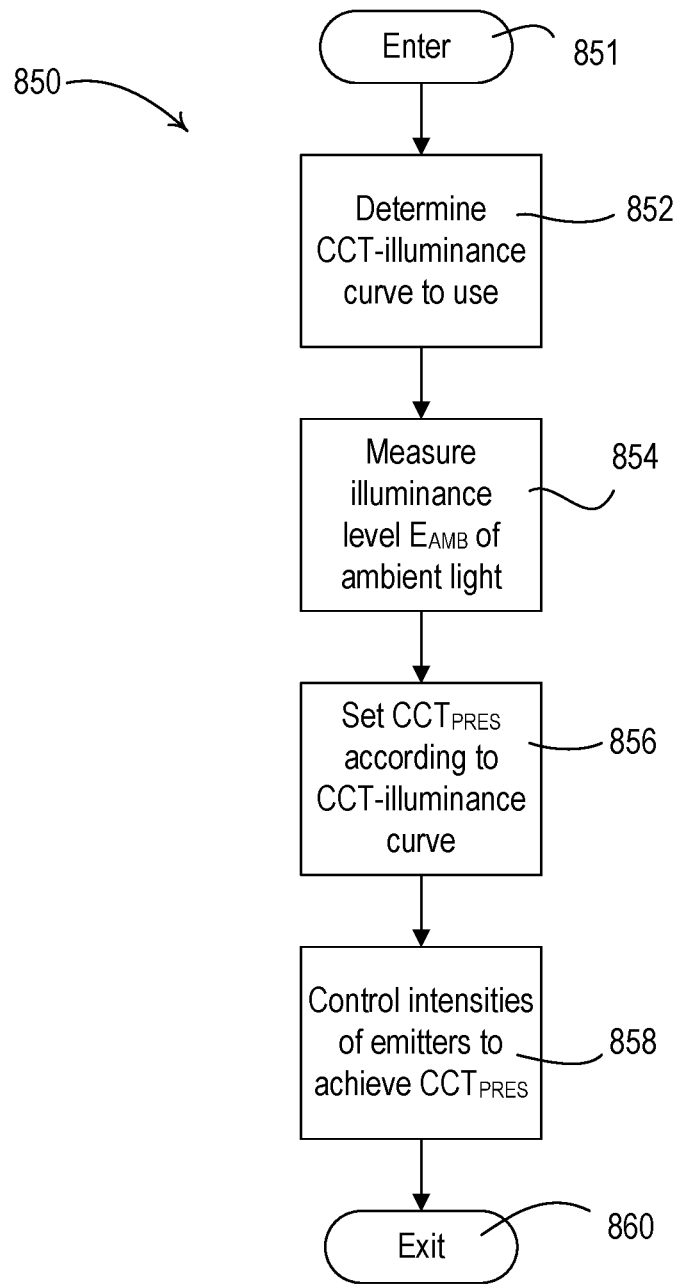

FIG. 8B is a flowchart depicting an example control procedure 850 for adjusting a color of light emitted by a lighting device based on an illuminance level (e.g., a light level) of ambient light in which the lighting device is installed. The control procedure 850 may be executed as part of a color control procedure. The control procedure 850 may be implemented by one or more devices. For example, the control procedure 850 may be executed by a control circuit of a lighting device (e.g., such as a control circuit of the lighting device 100 shown in FIG. 1, a control circuit of the lighting device 200 shown in FIG. 2, and/or the lighting device control circuit 440 of the lighting device 400 shown in FIG. 4), a control circuit of a remote control device, and/or a control circuit of a system controller to adjust a color (e.g., a present color temperature $CCT_{PRES}$) of light emitted by the lighting device. For example, the control circuit may execute the control procedure 850 periodically at 851. In addition, the control circuit may execute the control procedure 800 at 851 in response to a change in the illuminance level of the ambient light and/or a change in a target intensity of the lighting device. The control circuit may execute the control procedure 800 to ensure that the light in a space is pleasing (e.g., within region 730 of the chart 700 shown in FIG. 7). The light in the space may be considered pleasing if it does not appear too reddish or bluish.

At 852, the control circuit may determine the values of a CCT-illuminance curve (e.g., the CCT-illuminance curve 740 shown in FIG. 7). For example, the values of the CCT-illuminance curve may be stored in memory on the lighting device and the control circuit may retrieve the values of the CCT-illuminance curve from memory at 852. The values of the CCT-illuminance curve may be fixed values and/or may be configurable values. For example, a user may configure the values of the CCT-illuminance curve using a computing device, and the configured values may be transmitted to the lighting device and stored in memory. In examples, the control circuit may determine (e.g., select) the CCT-illuminance curve from a plurality of CCT-illuminance curves stored in a memory. In addition, the control circuit may automatically configure (e.g., learn) the values of the CCT-illuminance curve, for example, in response to detecting changes in the color temperature of the lighting device as manually adjusted by a user. For example, the lighting device may identify a manual adjustment of the color temperature by a user. The lighting device may be configured to store a plurality of previous user adjustments in memory. The CCT-illuminance curve may be adjusted (e.g., learned) based on the plurality of previous user adjustments.

At 854, the control circuit may determine an illuminance level $E_{AMB}$ of ambient light proximate to the lighting device. The ambient light may be proximate to the lighting device if it is in the same space (e.g., room) as the lighting device. The lighting device may include one or more sensors (e.g., such as the detectors 312 shown in FIG. 3) configured to measure the illuminance level $E_{AMB}$ of the ambient light. The control circuit may receive an indication of the illuminance level $E_{AMB}$ of the ambient light proximate to the lighting device. The indication of the illuminance level $E_{AMB}$ of the ambient light may be received from the one or more sensors. The control circuit may be configured to determine the illuminance level $E_{AMB}$ of the ambient light in response to the sensors. Alternatively and/or additionally, the indication of the illuminance level $E_{AMB}$ of the ambient light may be received via a wireless communication circuit of the lighting device (e.g., from an external sensor).

At 856, the control circuit may set the present color temperature $CCT_{PRES}$ based on the CCT-illuminance curve (e.g., as determined at 852) and the illuminance level $E_{AMB}$ (e.g., as determined at 854) For example, the control circuit may set the present color temperature $CCT_{PRES}$ equal to the value of the CCT-illuminance curve at the illuminance level $E_{AMB}$. After the control circuit sets the present color temperature $CCT_{PRES}$ at 856, the control circuit may control a drive circuit (e.g., the LED drive circuit 432) at 858 to control emitters (e.g., the emitters 411, 412, 413, 414) to respective intensities to cause the lighting device to emit light at present color temperature $CCT_{PRES}$ (e.g., as determined at 856). The control procedure 850 may then end to 860.

Figure 9:
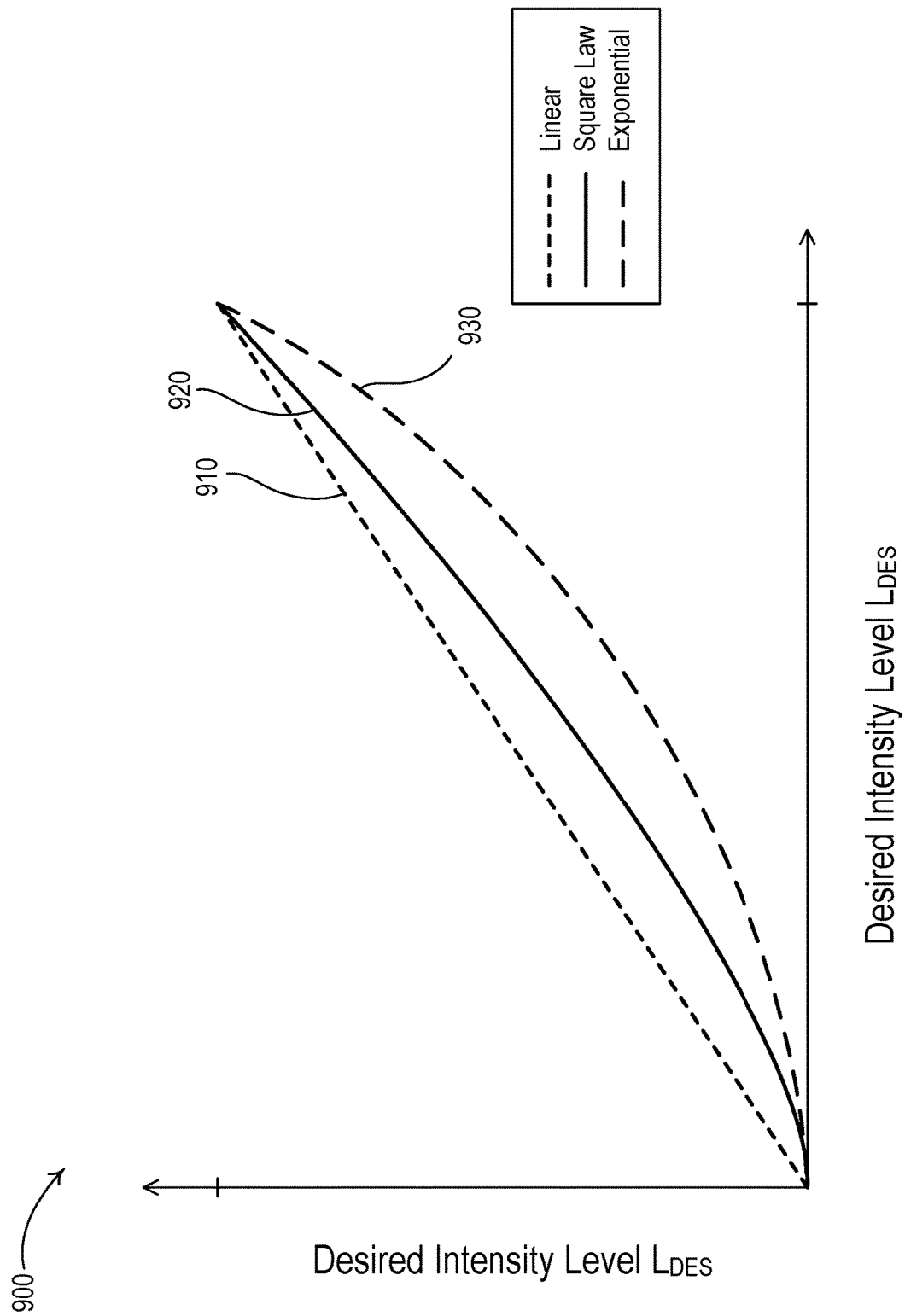
FIG. 9 depicts a plurality of dimming curves.

FIG. 9 is a chart 900 depicting a plurality of dimming curves. The chart 900 comprises a linear dimming curve 910, a square law dimming curve 920, and an exponential dimming curve 930. A lighting device (e.g., such as the lighting device 100 shown in FIG. 1, the lighting device 200 shown in FIG. 2, and/or the lighting device 400 shown in FIG. 4) may determine to use one or more of the dimming curves. The dimming curves of the lighting device may each define values of actual intensity (e.g., the present intensity $L_{PRES}$ and/or the target intensity $L_{TRGT}$) with respect to controlled intensity (e.g., as determined from messages received via the communication circuit 434). In examples, the lighting device may use the linear dimming curve 910, the square law dimming curve 920, and/or the exponential dimming curve 930 over the full range of intensities. For example, the lighting device may use one of the dimming curves based on an illuminance level (e.g., a light level) of ambient light in which the lighting device is installed. In examples, the lighting device may use a first dimming curve over a first range of illuminance levels of the ambient light and a second dimming curve over a second range of illuminance levels of the ambient light. For example, the lighting device may use the square law curve 920 over the first range of illuminance levels and the linear dimming curve 910 or the exponential dimming curve 930 over the second range of illuminance levels.

Figure 10:
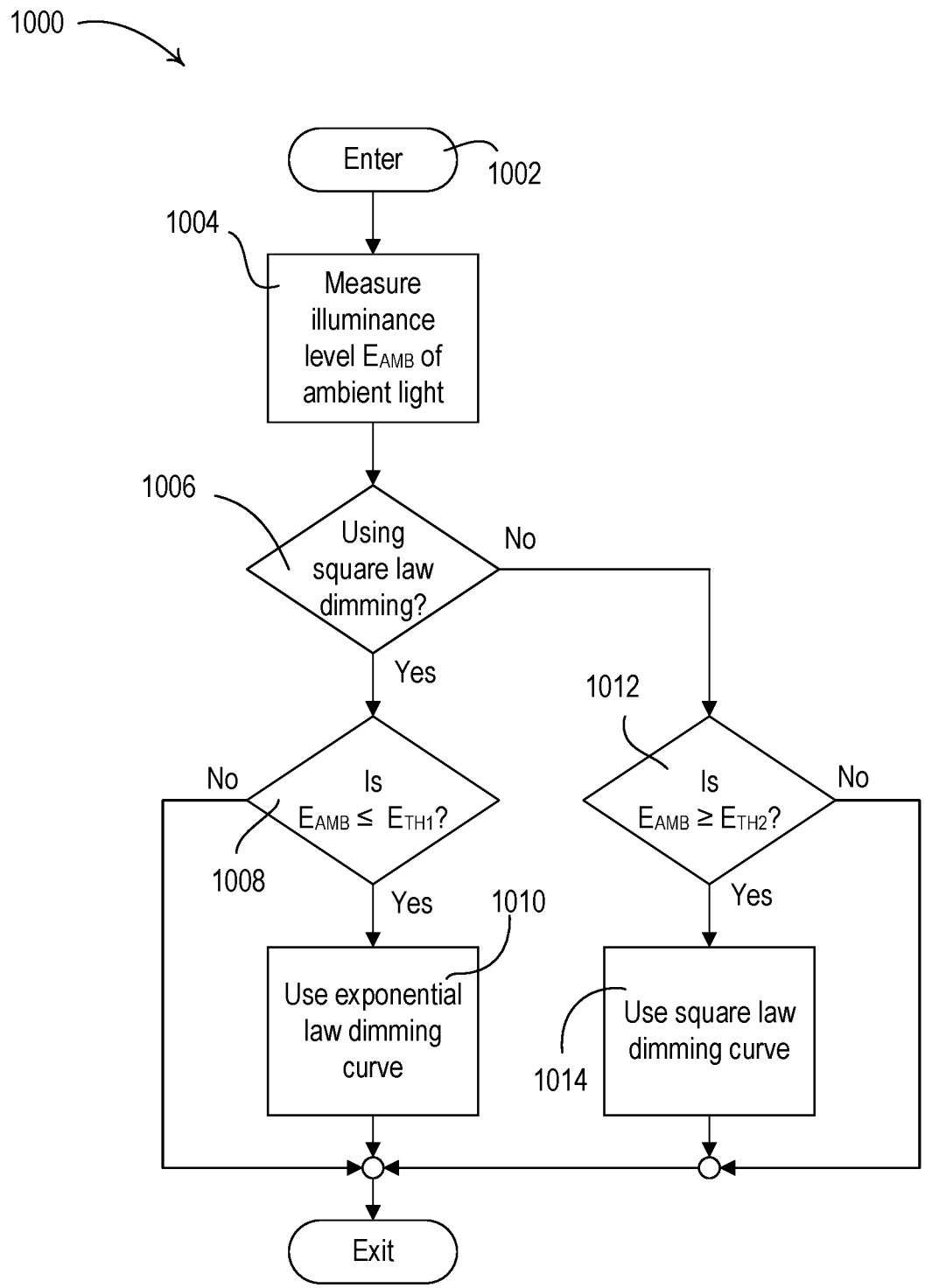
FIG. 10 is a flowchart depicting an example control procedure for selecting a dimming curve.

FIG. 10 is a flowchart depicting an example control procedure 1000 for selecting a dimming curve based on an illuminance level (e.g., a light level) of ambient light in which the lighting device is installed. The method 1000 may be executed as part of a control procedure (e.g., an intensity control procedure). The control procedure 1000 may be implemented by one or more devices. For example, the control procedure 1000 may be executed by a control circuit of a lighting device (e.g., such as a control circuit of the lighting device 100 shown in FIG. 1, a control circuit of the lighting device 200 shown in FIG. 2, or the lighting device control circuit 440 of the lighting device 400 shown in FIG. 4), a control circuit of a remote control device, and/or a control circuit of a system controller to determine a dimming curve for controlling an intensity of light emitted by the lighting device. The control procedure 1000 may be used to control an intensity of light emitted by the lighting device by controlling a drive circuit (e.g., the LED drive circuit 432) of the lighting device to control emitters (e.g., the emitters 411, 412, 413, 414). For example, the control circuit may execute the control procedure 1000 periodically at 1002. In addition, the control circuit may execute the control procedure 1000 at 1002 by the lighting device in response to a change in the illuminance level of the ambient light.

The control procedure 1000 may be executed to use a dimming curve with finer granularity at a low ambient light level. For example, when the ambient light level is high (e.g., when the ambient light level is greater than an illuminance threshold $E_{TH}$), the control circuit may be configured to use a normal dimming curve (e.g., the linear dimming curve 910 and/or the square law dimming curve 920 shown in FIG. 9), which may provide a substantially constant amount of change of the actual intensity of the lighting device per step change in the controlled intensity. When the ambient light level is low, the control circuit may be configured to use a low-level dimming curve (e.g., the exponential dimming curve 930), for example, to provide a higher granularity in the adjustment of the actual intensity of the lighting device per step change in the controlled intensity near the low-end intensity $L_{LE}$. The control circuit may use hysteresis when determining which of the dimming curves to use. For example, when the lighting device is using the normal dimming curve, the control circuit may start to use (e.g., switch to) the low-level dimming curve when the ambient light level is less than a first illuminance threshold $E_{TH1}$. In addition, when the lighting device is using the low-level dimming curve, the control circuit may start to use (e.g., switch to) the normal dimming curve when the ambient light level is greater than a second illuminance threshold $E_{TH2}$ (e.g., which may be greater than the first illuminance threshold $E_{TH1}$).

At 1004, the control may determine an illuminance level $E_{AMB}$ of ambient light proximate to the lighting device. The ambient light may be proximate to the lighting device if it is in the same space (e.g., room) as the lighting device. The lighting device may include one or more sensors (e.g., such as the detectors 312 shown in FIG. 3) configured to measure the illuminance level $E_{AMB}$ of the ambient light. The control circuit may receive an indication of the illuminance level $E_{AMB}$ of the ambient light proximate to the lighting device. The indication of the illuminance level $E_{AMB}$ of the ambient light may be received from the one or more sensors. The control circuit may be configured to determine the illuminance level $E_{AMB}$ of the ambient light in response to the sensors. Alternatively and/or additionally, the indication of the illuminance level $E_{AMB}$ of the ambient light may be received via a wireless communication circuit of the lighting device (e.g., from an external sensor).

When the lighting device is using a normal dimming curve (e.g., the square law dimming curve) at 1006, the lighting device may compare the determined illuminance level $E_{AMB}$ of the ambient light to the first illuminance threshold $E_{TH1}$ at 1008. The first predetermined illuminance threshold $E_{TH1}$ may correspond to a low illuminance level of the ambient light. For example, the lighting device may determine whether the illuminance level $E_{AMB}$ of the ambient light is less than or equal to the first illuminance threshold $E_{TH1}$. If the illuminance level of the ambient light is less than the first illuminance threshold $E_{TH1}$, the control circuit at 1008 may determine to control a lighting load of the lighting device according to a low-level dimming curve, such as the exponential dimming curve (e.g., the exponential dimming curve 930 shown in FIG. 9) at 1010. The exponential law dimming curve may enable a finer granularity of dimming below the low illuminance level of ambient light than a normal dimming curve, such as the square law dimming curve. For example, the control circuit may at 1010 control the lighting device to adjust (e.g., fade) the intensity from a first intensity at the determined illuminance level $E_{AMB}$ of the ambient light (e.g., according to the normal dimming curve) to a second intensity at the determined illuminance level $E_{AMB}$ of the ambient light (e.g., according to the low-light dimming curve across a period of time (e.g., 1-60 minutes), such that the change in the intensity is not noticed by a user.

When the lighting device is not using a normal dimming curve at 1006 (e.g., the lighting device is using the exponential dimming curve), the lighting device may compare the determined illuminance level $E_{AMB}$ of the ambient light to the second illuminance threshold $E_{TH2}$ at 1012. The second predetermined illuminance threshold $E_{TH2}$ may correspond to a high illuminance level of the ambient light. If the illuminance level $E_{AMB}$ of the ambient light is greater than or equal to the second illuminance threshold $E_{TH2}$, the control circuit at 1014 may determine to control the lighting load according to a normal law dimming curve, such as the square law dimming curve (e.g., such as the square law dimming curve 920 shown in FIG. 9) at 1014. For example, the control circuit may at 1013 control the lighting device to adjust (e.g., fade) the intensity from a first intensity at the determined illuminance level $E_{AMB}$ of the ambient light (e.g., according to the low-light dimming curve) to a second intensity at the determined illuminance level $E_{AMB}$ of the ambient light (e.g., according to the normal dimming curve) across a period of time (e.g., 1-60 minutes), such that the change in the intensity is not noticed by a user.

The control circuit may be configured to control the lighting load based on a step size of the intensity and the illuminance level $E_{AMB}$ of the ambient light proximate to the lighting device. For example, the intensity of the lighting load may be adjusted when a user presses a button. Each button press may correspond to a step change in intensity. The control circuit may be configured to control the lighting load according to the normal law dimming curve, at 1014, when the illuminance level of the ambient light proximate to the lighting device is below a third illuminance threshold $E_{TH3}$. The third illuminance threshold $E_{TH3}$ may be a step change threshold. The control circuit may be configured to control the lighting load according to the exponential law dimming curve, at 1010, when the illuminance level of the ambient light proximate to the lighting device is greater than or equal to the third illuminance threshold $E_{TH3}$. As described herein, the exponential law dimming curve may enable a finer granularity of dimming below the third illuminance threshold $E_{TH3}$ of ambient light than a normal dimming curve, such as the square law dimming curve. For example, controlling the lighting load using the normal dimming curve at low ambient light levels may enable the control circuit to adjust from a current intensity to a target intensity with fewer button presses when compared to the exponential law dimming curve. Stated differently, the normal dimming curve may enable larger intensity step sizes for each button press when compared to the exponential law dimming curve.

It should be appreciated that although FIGS. 1 and 2 depict example lighting devices 100, 200; the disclosure herein is not limited to these example lighting devices 100, 200. Instead, the lighting device(s) referred to herein, may be any lighting device such as a linear lighting device, a strip light, a bulb, a downlight, a tube, and/or the like.

What is claimed is:

1. A lighting device comprising:
    a wireless communication circuit that is configured to communicate wireless messages;
    a lighting load;
    a drive circuit for controlling the lighting load to emit light having a first color; and
    a control circuit configured to:
        receive, via the wireless communication circuit, a first message indicating a second color;
        determine whether the first color and the second color are on a black body curve;
        in response to determining that the first color and the second color are on the black body curve, control the drive circuit to fade the light emitted by the lighting load to a plurality of correlated color temperature (CCT) chromaticity values along the black body curve between the first color and the second color in a CCT chromaticity space; and
        in response to determining that one or more of the first color or the second color are not on the black body curve, control the drive circuit to fade the light emitted by the lighting load from the first color to the second color in an XY chromaticity space.

2. The lighting device of claim 1, wherein the lighting load comprises a plurality of light-emitting diodes (LEDs), and wherein the control circuit is configured to determine target values for luminous flux to be emitted from each of the plurality of LEDs such that the light emitted by the lighting device is adjusted from the first color to the second color.

3. The lighting device of claim 1, wherein the second color is indicated in the XY chromaticity space.

4. The lighting device of claim 3, wherein the first message comprises an x-chromaticity coordinate and a y-chromaticity coordinate that indicates the second color.

5. The lighting device of claim 1, wherein the second color is indicated in the CCT chromaticity space.

6. The lighting device of claim 1, wherein being on the black body curve comprises being within a threshold value from the black body curve.

7. The lighting device of claim 6, wherein the threshold value is a delta uv measurement.

8. The lighting device of claim 6, wherein the control circuit is further configured to:
    determine that the first color is greater than the threshold value from the black body curve and the second color is on the black body curve; and
    based on the determination that the first color is greater than the threshold value from the blackbody curve and the second color is on the black body curve, control the drive circuit such that the light emitted by the lighting device is adjusted linearly to the second color.

9. The lighting device of claim 1, wherein the first color is a first color temperature in the CCT chromaticity space, and the second color is a second color temperature in the CCT chromaticity space.

10. The lighting device of claim 9, wherein the second color temperature is converted from the XY chromaticity space to the CCT chromaticity space based on a set of equations stored in a memory of the lighting device.

11. The lighting device of claim 9, wherein the second color temperature is converted from the XY chromaticity space to the CCT chromaticity space based on a look up table stored in a memory of the lighting device.

12. The lighting device of claim 9, wherein the control circuit is configured to perform a fade in the CCT chromaticity space according to a relationship between color temperature and time to control the lighting load such that the light emitted by the lighting device is adjusted from the first color temperature to the second color temperature along the black body curve.

13. The lighting device of claim 12, wherein the relationship is a linear relationship between color temperature and time.

14. The lighting device of claim 12, wherein the relationship is a non-linear relationship between color temperature and time to provide greater resolution with respect to time near warm-white color temperatures than near cool-white color temperatures.

15. The lighting device of claim 12, wherein the control circuit is configured to determine a plurality of CCT chromaticity values along the black body curve between the first color temperature and the second color temperature, and wherein the plurality of CCT chromaticity values are associated with the relationship between color temperature and time.

16. The lighting device of claim 15, wherein the control circuit is configured to convert the plurality of CCT chromaticity values into the XY chromaticity space to determine a plurality of XY chromaticity coordinates.

17. The lighting device of claim 16, wherein the control circuit is configured to:
    convert the CCT chromaticity values into a plurality of uv chromaticity values; and
    convert the plurality of uv chromaticity values into the plurality of XY chromaticity coordinates.

18. The lighting device of claim 16, wherein the control circuit is configured to control the drive circuit based on the plurality of XY chromaticity coordinates.

19. The lighting device of claim 18, wherein the control circuit is configured to sequentially send each of the plurality of XY chromaticity coordinates to the drive circuit at respective time instances to control the drive circuit such that the light emitted by the lighting device is adjusted from the first color temperature to the second color temperature along the black body curve.

20. The lighting device of claim 19, wherein the control circuit is configured to:
    determine a time schedule associated with the second color temperature; and
    send, according to the time schedule, the plurality of XY chromaticity coordinates to the drive circuit.

21. The lighting device of claim 20, wherein the control circuit is configured to:
    determine a time delay between each of the plurality of XY chromaticity coordinates; and send, according to the determined time delay, the plurality of XY chromaticity coordinates to the LED drive circuit.

22. The lighting device of claim 12, wherein the control circuit is configured to determine whether the relationship is a linear relationship or a non-linear relationship between color temperature and time based on an estimated perceived change in color.

23. The lighting device of claim 22, wherein the control circuit is configured to determine that the relationship is the non-linear relationship when using the linear relationship would result in discontinuous perceived changes in color temperature.

24. The lighting device of claim 1, further comprising one or more sensors configured to measure a color of the light emitted by the lighting device.

25. The lighting device of claim 24, wherein the control circuit is configured to:
compare the measured color of the lighting device to the second color; and
adjust, when the measured color is different than the second color by more than a predetermined value, the control of the lighting load until the measured color is within the predetermined value of the second color.

26. The lighting device of claim 1, wherein the first message comprises a fade request in the XY chromaticity space.

27. The lighting device of claim 26, wherein the fade request comprises fade information associated with the second color.

28. The lighting device of claim 1, wherein the first color is an initial color and the second color is a destination color.

29. The lighting device of claim 1, wherein the control circuit is configured to iteratively adjust the color of light emitted by the lighting load from the first color to the second color in the CCT chromaticity space.

30. The lighting device of claim 1, wherein the control circuit is further configured to:
determine an illuminance level for the lighting load; and
determine whether the second color is less than a red threshold temperature or greater than a blue threshold temperature at the determined illuminance level.

31. The lighting device of claim 30, wherein the control circuit is further configured to, when the second color is less than the red threshold temperature at the determined illuminance level, control the lighting load such that the light emitted by the lighting device comprises a third color that is equal to or greater than the red threshold temperature at the determined illuminance level.

32. The lighting device of claim 30, wherein the control circuit is further configured to, when the second color is greater than the blue threshold temperature at the determined illuminance level, control the lighting load such that the light emitted by the lighting device comprises a third color that is equal to or less than the blue threshold temperature at the determined illuminance level.

33. The lighting device of claim 1, wherein the control circuit is further configured to:
determine an ambient light level proximate to the lighting device;
compare the ambient light level to a predetermined threshold;
control, when the ambient light level is greater than a predetermined threshold, the lighting load according to a first dimming curve; and
control, when the ambient light level is less than a predetermined threshold, the lighting load according to a second dimming curve.

34. A method for controlling a lighting device emitting light having a first color, the method comprising:
receiving, via a wireless communication circuit, a first message indicating a second color;
determining whether the first color and the second color are on a black body curve;
in response to determining that the first color and the second color are on the black body curve, fading the light emitted by the lighting device to a plurality of correlated color temperature (CCT) chromaticity values along the black body curve between the first color and the second color in a CCT chromaticity space; and
in response to determining that one or more of the first color or the second color are not on the black body curve, fading the light emitted by the lighting device from the first color to the second color in an XY chromaticity space.

35. The method of claim 34, wherein the first message comprises an x-chromaticity coordinate and a y-chromaticity coordinate that indicates the second color.

36. The method of claim 34, wherein the first color is a first color temperature in the CCT chromaticity space, and the second color is a second color temperature in the CCT chromaticity space.

37. The method of claim 36, further comprising converting the second color temperature from the XY chromaticity space to the CCT chromaticity space based on a set of equations stored in a memory of the lighting device.

38. The method of claim 36, further comprising converting the second color temperature from the XY chromaticity space to the CCT chromaticity space based on a look up table stored in a memory of the lighting device.

39. The method of claim 36, wherein the light emitted by the lighting load is faded in the CCT chromaticity space according to a relationship between color temperature and time to control the lighting load such that the light emitted by the lighting device is adjusted from the first color temperature to the second color temperature along the black body curve.

40. The method of claim 39, wherein the relationship is a linear relationship between color temperature and time.

41. The method of claim 39, wherein the relationship is a non-linear relationship between color temperature and time to provide greater resolution with respect to time near warm-white color temperatures than near cool-white color temperatures.

42. The method of claim 39, further comprising:
determining a plurality of CCT chromaticity values along the black body curve between the first color temperature and the second color temperature;
wherein the plurality of CCT chromaticity values are associated with the relationship between color temperature and time.

43. The method of claim 34, further comprising sequentially sending each of the plurality of CCT chromaticity values to a drive circuit of the lighting device at respective time instances to control the drive circuit such that the light emitted by the lighting device is faded from the first color temperature to the second color temperature along the black body curve.

44. A non-transitory, machine-readable storage device that includes instructions that, when executed by a computing device, cause the computing device to:

receive, via a wireless communication circuit, a first message indicating a second color;

determine whether a first color and the second color are on a black body curve, wherein a lighting device is emitting light having the first color;

in response to determining that the first color and the second color are on the black body curve, fade the light emitted by the lighting device to a plurality of correlated color temperature (CCT) chromaticity values along the black body curve between the first color and the second color in a CCT chromaticity space; and in response to determining that one or more of the first color or the second color are not on the black body curve, fade the light emitted by the lighting device from the first color to the second color in an XY chromaticity space.

45. The non-transitory, machine-readable storage device of claim 44, wherein the first message comprises an x-chromaticity coordinate and a y-chromaticity coordinate that indicates the second color.

46. The non-transitory, machine-readable storage device of claim 44, wherein the first color is a first color temperature in the CCT chromaticity space, and the second color is a second color temperature in the CCT chromaticity space.

47. The non-transitory, machine-readable storage device of claim 46, wherein the instructions, when executed by the computing device, cause the computing device to convert the second color temperature from the XY chromaticity space to the CCT chromaticity space based on a set of equations stored in a memory of the lighting device.

48. The non-transitory, machine-readable storage device of claim 46, wherein the instructions, when executed by the computing device, cause the computing device to convert the second color temperature from the XY chromaticity space to the CCT chromaticity space based on a look up table stored in a memory of the lighting device.

49. The non-transitory, machine-readable storage device of claim 46, wherein the light emitted by the lighting load is faded in the CCT chromaticity space according to a relationship between color temperature and time to control the lighting load such that the light emitted by the lighting device is adjusted from the first color temperature to the second color temperature along the black body curve.

50. The non-transitory, machine-readable storage device of claim 49, wherein the relationship is a linear relationship between color temperature and time.

51. The non-transitory, machine-readable storage device of claim 49, wherein the relationship is a non-linear relationship between color temperature and time to provide greater resolution with respect to time near warm-white color temperatures than near cool-white color temperatures.

52. The non-transitory, machine-readable storage device of claim 49, wherein the instructions, when executed by the computing device, cause the computing device to determine a plurality of CCT chromaticity values along the black body curve between the first color temperature and the second color temperature, and wherein the plurality of CCT chromaticity values are associated with the relationship between color temperature and time.

53. The non-transitory, machine-readable storage device of claim 44, wherein the instructions, when executed by the computing device, cause the computing device to sequentially send each of the plurality of CCT chromaticity values to a drive circuit of the lighting device at respective time instances to control the drive circuit such that the light emitted by the lighting device is faded from the first color temperature to the second color temperature along the black body curve.

\* \* \* \* \*